United States Patent
Merritt et al.

(10) Patent No.: US 8,177,877 B2
(45) Date of Patent: May 15, 2012

(54) FILTER FRAME ATTACHMENT AND FLUTED FILTER HAVING SAME

(75) Inventors: Steven J. Merritt, Kearney, NE (US); Chad Banzhaf, Kearney, NE (US); Kyle Swanson, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 0 days.

(21) Appl. No.: 13/069,575

(22) Filed: Mar. 23, 2011

(65) Prior Publication Data

US 2011/0226406 A1    Sep. 22, 2011

Related U.S. Application Data

(62) Division of application No. 12/164,987, filed on Jun. 30, 2008.

(51) Int. Cl.
*B01D 46/00* (2006.01)

(52) U.S. Cl. .................. 55/502; 55/DIG. 5; 55/DIG. 31; 264/257

(58) Field of Classification Search .................... 55/497, 55/498, 502, 521, DIG. 5, DIG. 31; 264/241, 264/257
See application file for complete search history.

(56) References Cited

U.S. PATENT DOCUMENTS

| | | |
|---|---|---|
| 1,700,126 A | 1/1929 | Godloe |
| 1,943,080 A | 1/1934 | Langston |
| 1,947,066 A | 2/1934 | Sieg |
| 1,954,881 A | 4/1934 | List |
| 3,025,963 A | 3/1962 | Bauer |
| 3,255,889 A | 6/1966 | Goldman et al. |
| 3,397,518 A | 8/1968 | Rogers |
| 3,438,588 A | 4/1969 | Steinholtz et al. |
| 3,676,247 A | 7/1972 | Morris et al. |
| 3,679,057 A | 7/1972 | Perez |
| 4,252,591 A | 2/1981 | Rosenberg |
| 4,253,228 A | 3/1981 | Easley |
| 4,257,790 A | 3/1981 | Bergquist et al. |
| 4,498,989 A | 2/1985 | Miyakawa et al. |
| 4,579,698 A | 4/1986 | Meyering et al. |
| 4,589,983 A | 5/1986 | Wydevan |
| 4,720,292 A | 1/1988 | Engel et al. |
| 4,747,944 A | 5/1988 | George |
| H556 H | 12/1988 | Tarko |

(Continued)

FOREIGN PATENT DOCUMENTS

DE    29 47 080 A1    5/1981

(Continued)

OTHER PUBLICATIONS

U.S. Appl. No. 13/042,859, filed Mar. 8, 2011, Merritt et al.

*Primary Examiner* — Robert Clemente
(74) *Attorney, Agent, or Firm* — Reinhart Boerner Van Deuren P.C.

(57) ABSTRACT

A filter element includes a filter media pack, a frame, an annular seal, and a sealing means independent of the annular seal, attaching the filter media pack and the frame. The means of sealing an interface between the filter media pack and the frame include molding a filter media pack seal, plastic welding outer wraps of filter media pack to the frame, and securing the filter media pack and the frame using a bead of adhesive.

11 Claims, 17 Drawing Sheets

U.S. PATENT DOCUMENTS

| | | | |
|---|---|---|---|
| 4,798,575 A | 1/1989 | Siversson |
| 4,838,905 A | 6/1989 | Billiet et al. |
| 4,976,677 A | 12/1990 | Siversson |
| 4,976,857 A | 12/1990 | Solomon |
| 5,213,275 A | 5/1993 | Giesy |
| 5,238,474 A | 8/1993 | Kahlbaugh et al. |
| 5,245,897 A | 9/1993 | Arnold et al. |
| 5,338,325 A | 8/1994 | Stanelle |
| 5,346,675 A | 9/1994 | Usui et al. |
| 5,374,006 A | 12/1994 | Mheidle |
| 5,389,175 A | 2/1995 | Wenz |
| 5,435,870 A | 7/1995 | Takagaki et al. |
| 5,472,379 A | 12/1995 | Andress et al. |
| 5,484,466 A | 1/1996 | Brown et al. |
| 5,543,007 A | 8/1996 | Takagaki et al. |
| 5,588,945 A | 12/1996 | Lauderbaugh |
| 5,609,711 A | 3/1997 | Miller |
| 5,685,985 A | 11/1997 | Brown et al. |
| 5,720,790 A | 2/1998 | Kometani et al. |
| 5,755,843 A | 5/1998 | Sundquist |
| 5,772,883 A | 6/1998 | Rothman et al. |
| 5,792,242 A | 8/1998 | Haskett |
| 5,792,247 A | 8/1998 | Gillingham et al. |
| 5,820,646 A | 10/1998 | Gillingham et al. |
| 5,895,574 A | 4/1999 | Friedmann et al. |
| 5,902,364 A | 5/1999 | Tokar et al. |
| 6,022,305 A | 2/2000 | Choi et al. |
| 6,048,386 A | 4/2000 | Gillingham et al. |
| 6,179,890 B1 | 1/2001 | Ramos et al. |
| D437,402 S | 2/2001 | Gieseke et al. |
| 6,190,432 B1 | 2/2001 | Gieseke et al. |
| 6,210,469 B1 | 4/2001 | Tokar |
| 6,221,122 B1 | 4/2001 | Gieseke et al. |
| 6,235,195 B1 | 5/2001 | Tokar |
| D450,827 S | 11/2001 | Gieseke et al. |
| D450,828 S | 11/2001 | Tokar |
| 6,348,084 B1 | 2/2002 | Gieseke et al. |
| 6,348,085 B1 | 2/2002 | Tokar et al. |
| 6,350,291 B1 | 2/2002 | Gieseke et al. |
| 6,368,374 B1 | 4/2002 | Tokar et al. |
| 6,402,798 B1 | 6/2002 | Kallsen et al. |
| D460,169 S | 7/2002 | Anderson et al. |
| D461,003 S | 7/2002 | Gieseke et al. |
| 6,416,605 B1 | 7/2002 | Golden |
| D461,884 S | 8/2002 | Gieseke et al. |
| 6,436,162 B1 | 8/2002 | Wake et al. |
| 6,447,567 B1 | 9/2002 | Ehrenberg |
| D466,602 S | 12/2002 | Gieseke et al. |
| 6,511,599 B2 | 1/2003 | Jaroszczyk et al. |
| 6,517,598 B2 | 2/2003 | Anderson et al. |
| 6,533,845 B2 | 3/2003 | Tokar et al. |
| D473,637 S | 4/2003 | Golden |
| 6,547,857 B2 | 4/2003 | Gieseke et al. |
| 6,599,344 B2 | 7/2003 | Tokar et al. |
| 6,610,117 B2 | 8/2003 | Gieseke et al. |
| 6,610,126 B2 | 8/2003 | Xu et al. |
| 6,610,177 B2 | 8/2003 | Tsay et al. |
| D483,459 S | 12/2003 | DeWit et al. |
| D484,584 S | 12/2003 | Anderson et al. |
| 6,673,136 B2 | 1/2004 | Gillingham et al. |
| 6,703,675 B1 | 3/2004 | Rodgers |
| 6,706,087 B1 | 3/2004 | Gebler et al. |
| 6,743,317 B2 | 6/2004 | Wydeven |
| 6,746,518 B2 | 6/2004 | Gieseke et al. |
| 6,783,565 B2 | 8/2004 | Gieseke et al. |
| 6,851,569 B2 | 2/2005 | Conti et al. |
| 6,852,141 B2 | 2/2005 | Bishop et al. |
| 6,878,190 B1 | 4/2005 | Xu et al. |
| D506,539 S | 6/2005 | Bishop et al. |
| 6,946,012 B1 | 9/2005 | Miller et al. |
| 6,959,819 B2 | 11/2005 | Moscaritolo et al. |
| 6,960,245 B2 | 11/2005 | Tokar et al. |
| 6,966,940 B2 | 11/2005 | Krisko et al. |
| 6,974,490 B2 | 12/2005 | Gillingham et al. |
| 6,994,744 B2 | 2/2006 | Tokar et al. |
| 6,997,968 B2 | 2/2006 | Xu et al. |
| 7,001,450 B2 | 2/2006 | Gieseke et al. |
| 7,008,465 B2 | 3/2006 | Graham et al. |
| 7,008,467 B2 | 3/2006 | Krisko et al. |
| 7,090,712 B2 | 8/2006 | Gillingham et al. |
| 7,179,317 B2 | 2/2007 | Chung et al. |
| 7,211,124 B2 | 5/2007 | Gieseke et al. |
| 7,252,704 B2 | 8/2007 | Tokar et al. |
| 7,255,300 B2 | 8/2007 | Johnston |
| 7,270,692 B2 | 9/2007 | Gillingham et al. |
| 7,282,075 B2 | 10/2007 | Sporre et al. |
| 7,303,604 B2 | 12/2007 | Gieseke et al. |
| 7,316,723 B2 | 1/2008 | Chung et al. |
| 7,318,851 B2 | 1/2008 | Brown et al. |
| 7,318,852 B2 | 1/2008 | Chung et al. |
| 7,323,029 B2 | 1/2008 | Engelland et al. |
| 7,329,326 B2 | 2/2008 | Wagner et al. |
| 7,338,544 B2 | 3/2008 | Sporre et al. |
| 7,341,613 B2 | 3/2008 | Kirsch |
| 7,351,270 B2 | 4/2008 | Engelland et al. |
| 7,393,375 B2 | 7/2008 | Xu et al. |
| 7,396,375 B2 | 7/2008 | Nepsund et al. |
| 7,396,376 B2 | 7/2008 | Schrage et al. |
| 7,674,308 B2 | 3/2010 | Krisko et al. |
| 7,695,539 B2 | 4/2010 | Waibel |
| 7,753,982 B2 | 7/2010 | Merritt |
| 7,931,725 B2 | 4/2011 | Wydeven et al. |
| 2002/0100262 A1 | 8/2002 | Gieseke et al. |
| 2002/0184864 A1 | 12/2002 | Bishop et al. |
| 2002/0185008 A1 | 12/2002 | Anderson et al. |
| 2003/0089654 A1 | 5/2003 | Jainek |
| 2003/0121845 A1 | 7/2003 | Wagner et al. |
| 2003/0146149 A1 | 8/2003 | Binder et al. |
| 2003/0182909 A1 | 10/2003 | Gieseke et al. |
| 2003/0217534 A1 | 11/2003 | Krisko et al. |
| 2003/0226800 A1 | 12/2003 | Brown et al. |
| 2004/0071940 A1 | 4/2004 | Frey |
| 2004/0118771 A1 | 6/2004 | Schukar et al. |
| 2004/0221555 A1 | 11/2004 | Engelland et al. |
| 2005/0029184 A1 | 2/2005 | Desmarais |
| 2005/0166561 A1 | 8/2005 | Schrage et al. |
| 2005/0229561 A1 | 10/2005 | Nepsund et al. |
| 2005/0252182 A1 | 11/2005 | Golden et al. |
| 2006/0090431 A1 | 5/2006 | Brown |
| 2006/0090434 A1 | 5/2006 | Brown et al. |
| 2006/0091061 A1 | 5/2006 | Brown |
| 2006/0091064 A1 | 5/2006 | Brown et al. |
| 2006/0091066 A1 | 5/2006 | Driml et al. |
| 2006/0091084 A1 | 5/2006 | Merritt et al. |
| 2006/0101795 A1 | 5/2006 | Krisko et al. |
| 2006/0137316 A1 | 6/2006 | Krull et al. |
| 2006/0151655 A1 | 7/2006 | Johnston |
| 2006/0163150 A1 | 7/2006 | Golden et al. |
| 2007/0039296 A1 | 2/2007 | Schrage et al. |
| 2007/0175194 A1 | 8/2007 | Nepsund et al. |
| 2007/0186528 A1 | 8/2007 | Wydeven et al. |
| 2007/0193236 A1 | 8/2007 | Merritt |
| 2007/0199285 A1 | 8/2007 | Gieseke et al. |
| 2007/0234903 A1 | 10/2007 | Xu et al. |
| 2007/0261374 A1 | 11/2007 | Nelson et al. |
| 2007/0289265 A1 | 12/2007 | Coulonvaux et al. |
| 2008/0010959 A1 | 1/2008 | Gillingham et al. |
| 2008/0016832 A1 | 1/2008 | Krisko et al. |
| 2008/0022641 A1 | 1/2008 | Engelland et al. |
| 2008/0060329 A1 | 3/2008 | Brown et al. |
| 2008/0066434 A1 | 3/2008 | Kuempel et al. |
| 2008/0086990 A1 | 4/2008 | Kuempel et al. |
| 2008/0110142 A1 | 5/2008 | Nelson et al. |
| 2008/0110822 A1 | 5/2008 | Chung et al. |
| 2008/0115470 A1 | 5/2008 | Kuempel et al. |
| 2008/0115758 A1 | 5/2008 | Engelland et al. |
| 2008/0135471 A1 | 6/2008 | Merritt et al. |
| 2008/0209874 A1 | 9/2008 | Gieseke et al. |
| 2008/0216654 A1 | 9/2008 | Wagner et al. |
| 2008/0250763 A1 | 10/2008 | Widerski et al. |
| 2008/0250766 A1 | 10/2008 | Schrage et al. |
| 2008/0264020 A1 | 10/2008 | Schrage et al. |
| 2009/0114590 A1 | 5/2009 | Merritt et al. |
| 2009/0241494 A1 | 10/2009 | Schrage et al. |
| 2009/0255227 A1 | 10/2009 | Schrage et al. |
| 2009/0266041 A1 | 10/2009 | Schrage et al. |
| 2009/0301045 A1 | 12/2009 | Nelson et al. |

| | | | |
|---|---|---|---|
| 2009/0320423 A1 | 12/2009 | Merritt et al. | |
| 2009/0320424 A1 | 12/2009 | Merritt et al. | |
| 2010/0000934 A1 | 1/2010 | Brown | |
| 2010/0011725 A1 | 1/2010 | Babb | |
| 2010/0037570 A1 * | 2/2010 | Osendorf et al. | 55/355 |
| 2010/0044297 A1 | 2/2010 | Krogue et al. | |
| 2010/0115897 A1 | 5/2010 | Krisko et al. | |
| 2010/0242425 A1 | 9/2010 | Swanson et al. | |

FOREIGN PATENT DOCUMENTS

| | | |
|---|---|---|
| EP | 0 630 672 A1 | 12/1994 |
| GB | 1 579 883 | 11/1980 |
| GB | 2 103 106 A | 2/1983 |
| JP | S60-112320 | 7/1985 |
| JP | S60-124622 | 8/1985 |
| JP | 63-122617 | 6/1988 |
| JP | HEI 2-31131 | 8/1990 |
| WO | WO 03/047722 A2 | 6/2003 |
| WO | WO 2005/058461 A1 | 6/2005 |
| WO | WO 2005/077487 A1 | 8/2005 |
| WO | WO 2005/082484 A1 | 9/2005 |
| WO | WO 2005/123222 A1 | 12/2005 |
| WO | WO 2006/014941 A2 | 2/2006 |
| WO | WO 2006/017790 A1 | 2/2006 |
| WO | WO 2006/076456 A1 | 7/2006 |
| WO | WO 2006/076479 A1 | 7/2006 |
| WO | WO 2006/093960 A2 | 9/2006 |
| WO | WO 2007/009039 A1 | 1/2007 |
| WO | WO 2007/044677 A1 | 4/2007 |
| WO | WO 2007/056589 A2 | 5/2007 |
| WO | WO 2007/087233 A3 | 8/2007 |
| WO | WO 2007/145939 A2 | 12/2007 |
| WO | WO 2008/045325 A2 | 4/2008 |
| WO | WO 2008/095196 A1 | 8/2008 |
| WO | WO 2008/098185 A1 | 8/2008 |
| WO | WO 2008/106375 A2 | 9/2008 |

* cited by examiner

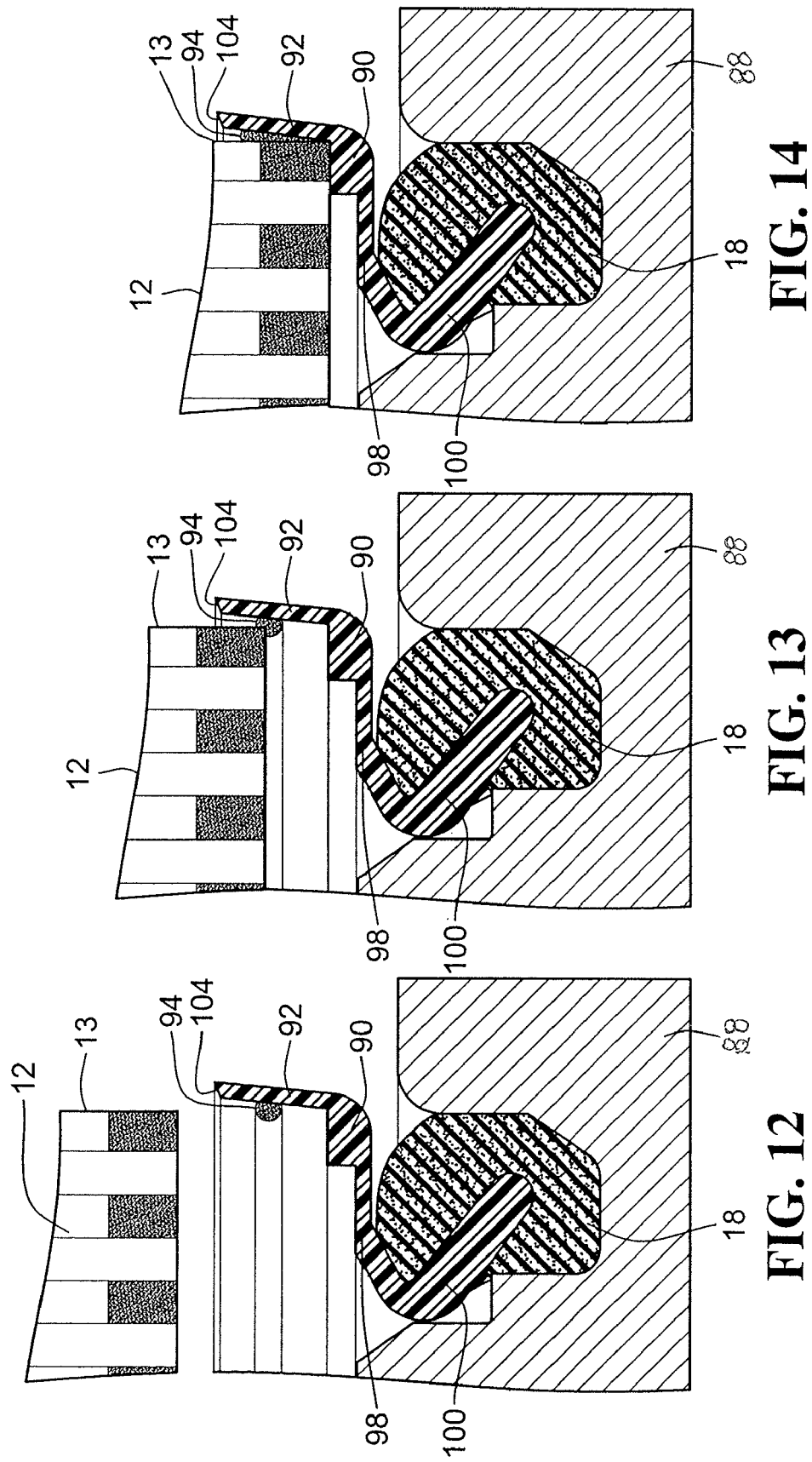

FILTER FRAME ATTACHMENT AND FLUTED FILTER HAVING SAME

CROSS-REFERENCE TO RELATED PATENT APPLICATIONS

This patent application is a Divisional of co-pending U.S. patent application Ser. No. 12/164,987 filed Jun. 30, 2008, which is pending, the entire teachings and disclosure of which are incorporated herein by reference thereto.

FIELD OF THE INVENTION

This invention generally relates to fluid filters, and more particularly to fluted filter elements having frames and seal support structures, and attachment methods for the same.

BACKGROUND OF THE INVENTION

Filtration devices and systems are employed in a wide range of applications for filtering contaminants from various process fluids. For example, it is known to pass air or similar gases through filter assemblies that enclose filtration media such as filter paper to remove dust and other contaminants. The filtration media is typically enclosed within a housing that is a permanent part of a larger overall process system (e.g. an engine) that utilizes the filtered fluids. Desirably, to prevent clogging of the filter, the filter assembly is constructed to facilitate the removal and replacement of the filtration media from the permanent housing. For this reason, the filtration media is typically configured into removable filter elements, also referred to herein as filter cartridges.

One commonly used filter media in construction of filter elements is fluted filter media. Fluted filter media is typically formed by winding a convoluted sheet and a face sheet about an axis to form a plurality of contiguous adjacent flutes. In one common form of such fluted filter media, alternating ends of adjacent flutes are blocked to cause fluid entering one open end of "inlet" flutes to flow through the porous filter media into adjacent "outlet" flutes prior to exiting the filter media at an opposite end of the flutes.

To enable removal of a filter element from the filter housing (not shown), typically a clearance gap is provided between the two components. To cause process fluids to pass through the filtration media rather than short circuit around the filter element, the filter element is often provided with a seal that abuts against the filter housing. Prior such filter elements are disclosed in U.S. Pat. No. 6,610,117 (Gieseke), U.S. Patent Application Publication No. 2006/0091061 (Brown), and U.S. Patent Application Publication No. 2006/0090434 (Brown, et al.) herein incorporated by reference in their entireties.

The present invention pertains to improvements in frames, seal support structures and how they are attached to a filter, such as a fluted filter.

BRIEF SUMMARY OF THE INVENTION

One inventive aspect pertains to separately molding seal support frame to filter pack apart from an annular seal carried by the frame. According to this aspect, the invention provides a filter element including a filter media pack with two flow faces on opposite ends with a central axis passing through the flow faces, and a frame secured to the filter media pack. The frame has a seal support portion carrying a seal for engaging a filter housing and forms at least a portion of a molding receptacle region. An interface between the filter media pack and the frame is sealed by a filter media pack seal generally occupying the molding receptacle region. The filter media pack of the present invention may be a fluted filter media including a face sheet and a convoluted sheet secured together and wound about the central axis to define a plurality of flutes including first flutes closed proximate one face and second flutes closed proximate the other face. The filter media pack of the present invention also may be other suitable filter media for filtering contaminants from fluid streams.

In another aspect, the invention provides a filter element wherein a fluted filter media pack is secured to a frame by plastic welding. The frame in this embodiment is formed at least in part from plastic material such that the outer wrap or wraps or outer side of the filter media pack is welded to the plastic portion of the frame using a suitable plastic welding process.

The present invention also provides for various methods of making a filter element. In one aspect, the invention provides a method of making a filter element including steps of forming a filter media pack having outer wraps, manufacturing a frame having a seal support portion and forming at least a portion of a molding receptacle region, molding an annular seal around the seal support portion, and separately molding a filter media pack seal generally occupying the molding receptacle region, thereby sealing an annular interface between the filter media pack and the frame.

In another aspect, the invention provides a method of securing a filter media pack to a frame including steps of forming a fluted filter media pack with outer wraps, manufacturing a frame with an annular plastic portion adapted for welding the outer wraps of the filter media pack, and welding the outer wraps of the filter media pack to the annular plastic portion.

According to a further aspect of the invention, a method of making a fluted filter element includes forming a frame including a seat and an annular wall surrounding the seat, laying an adhesive bead around the annular wall in spaced relation from the seat, and inserting the filter media pack into the annular wall toward the seat and engaging the adhesive bead causing the adhesive bead to shear along the annular wall in a continuous ring toward the seat.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 4:
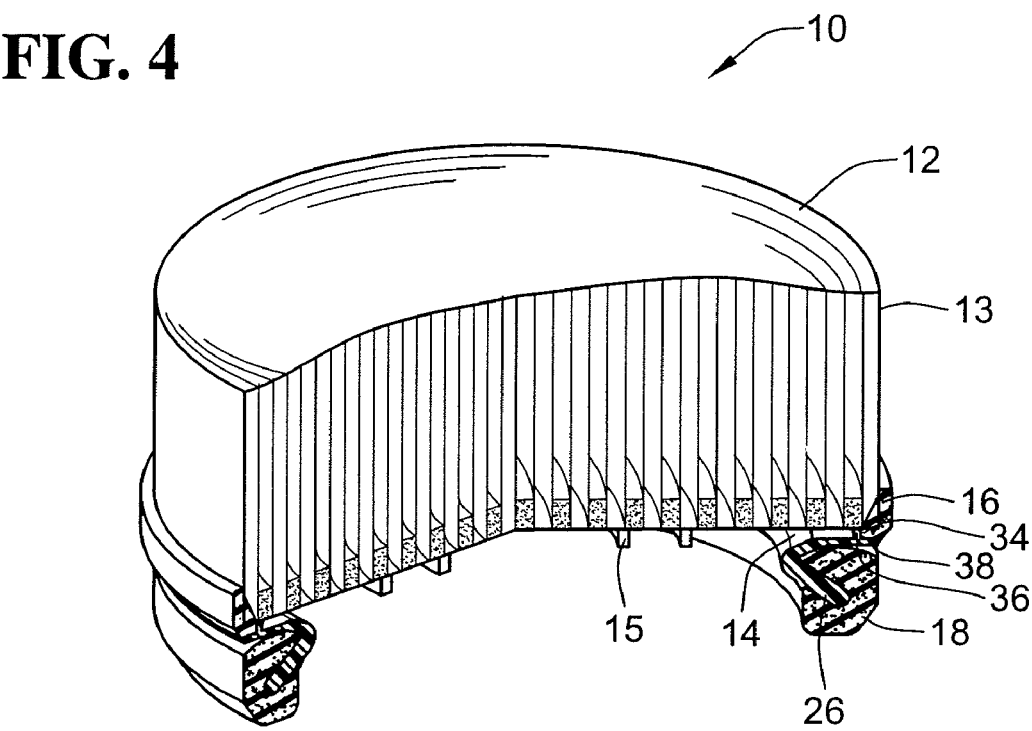
FIG. 4 is another perspective partial cross-sectional and fragmentary view of a lower portion of the first embodiment (e.g. the top portion of the filter media pack is cut away)
Figure 5:
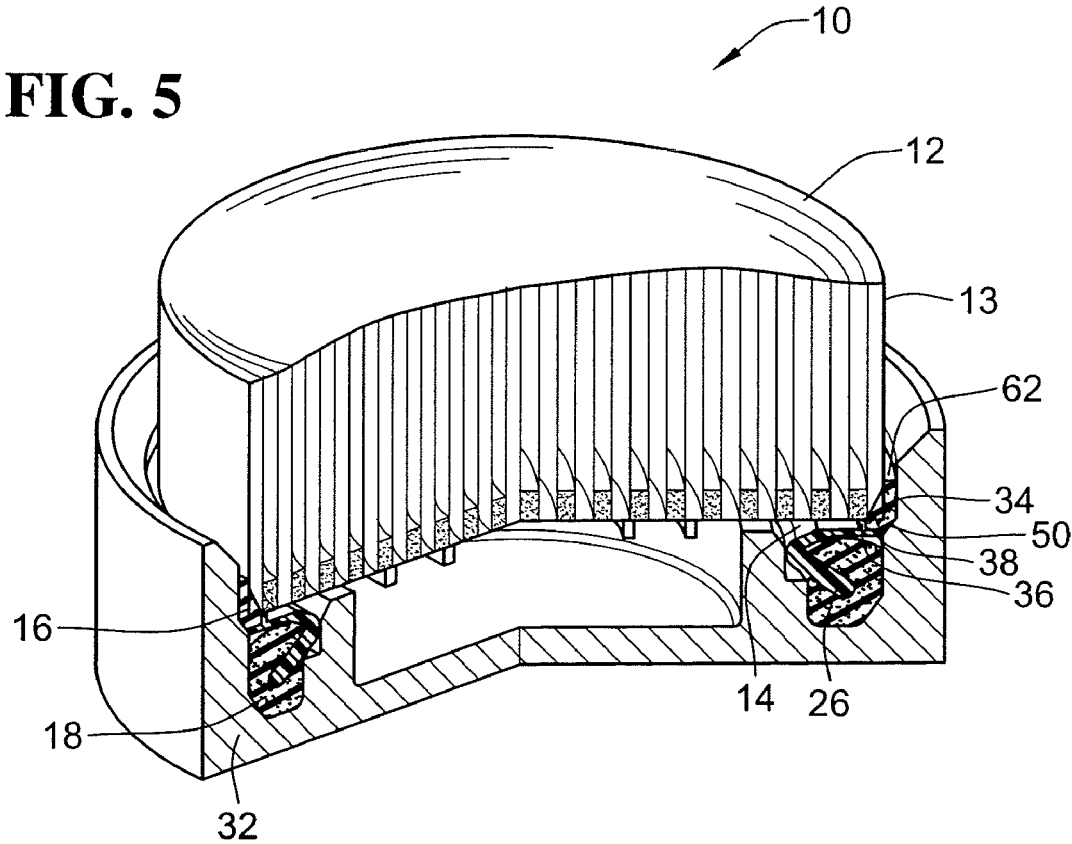
Figure 6:
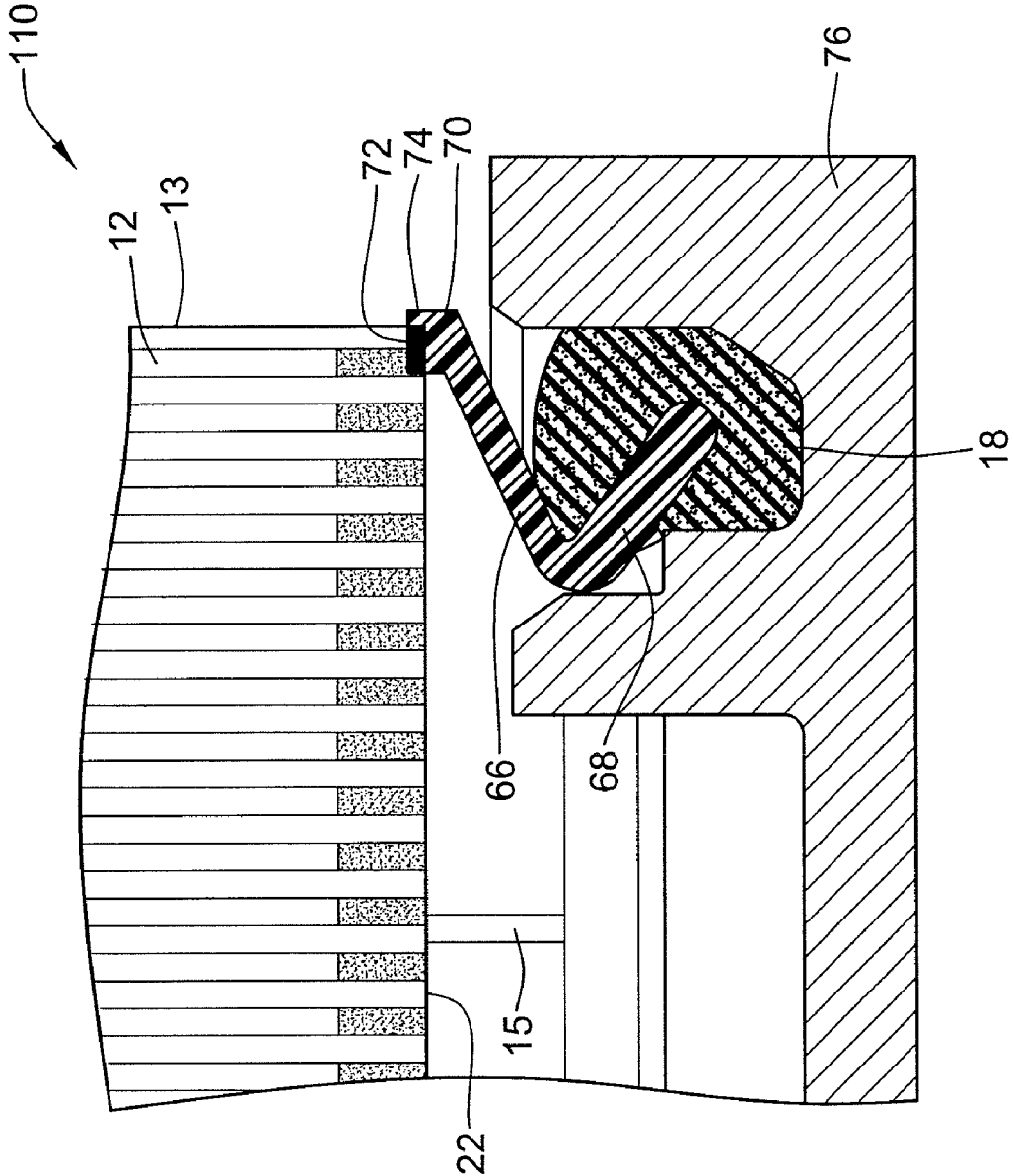
Figure 7:
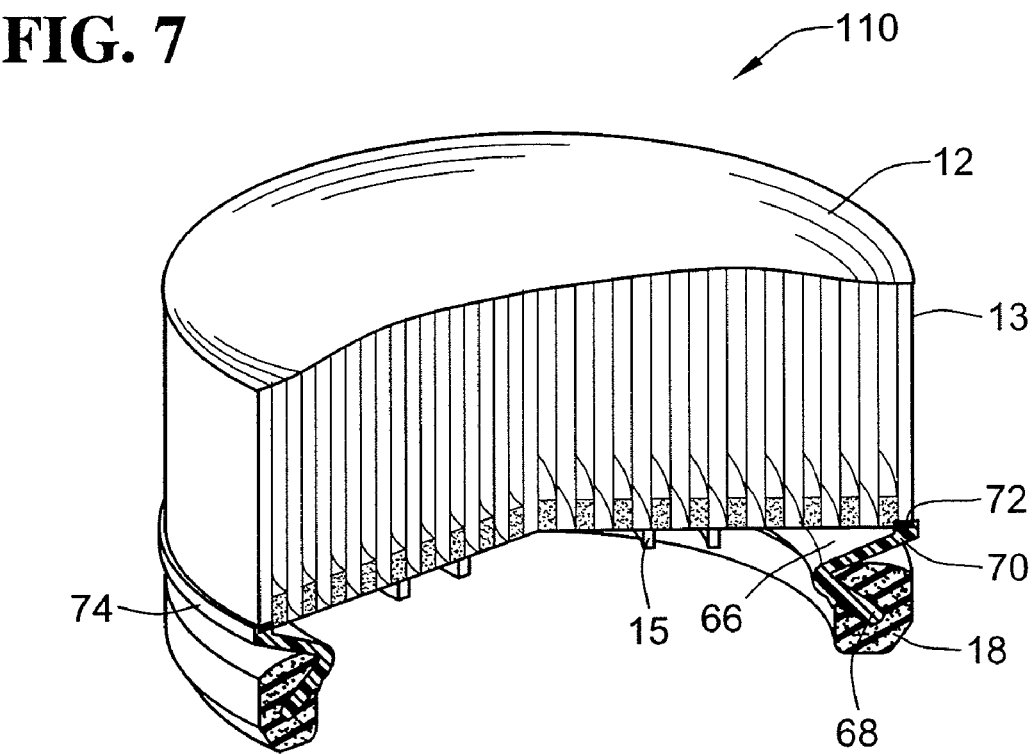
Figure 8:
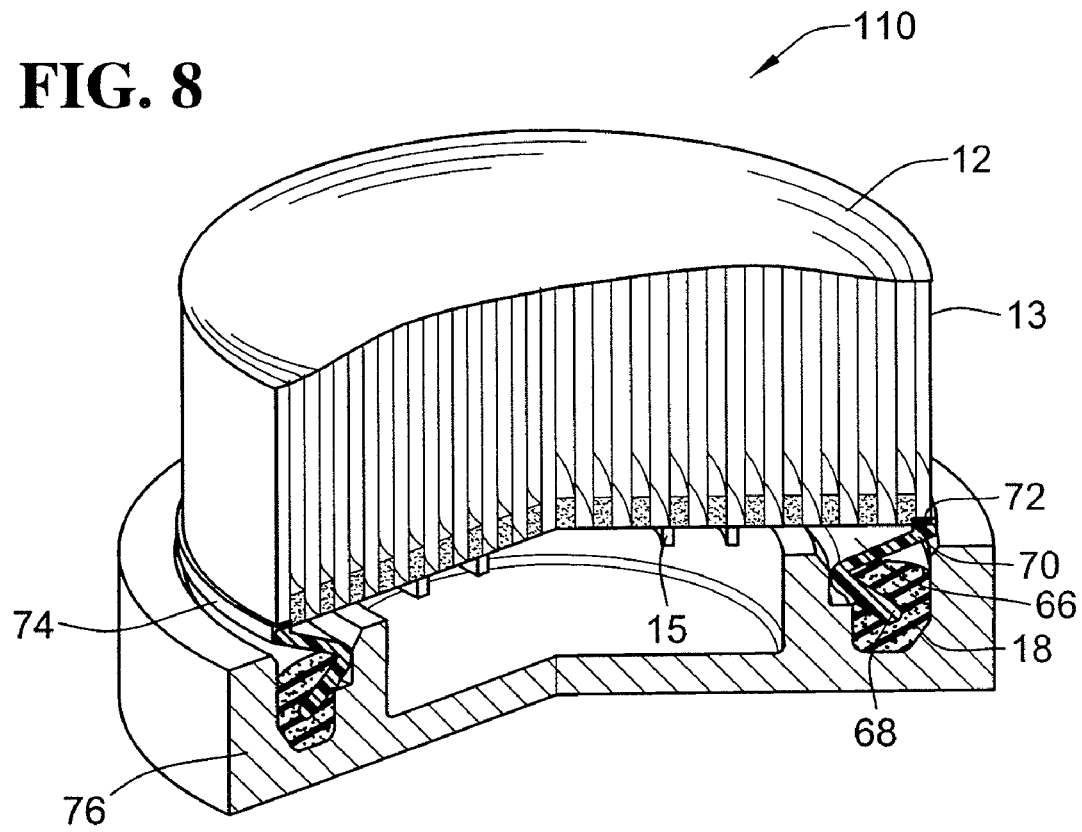
Figure 9:
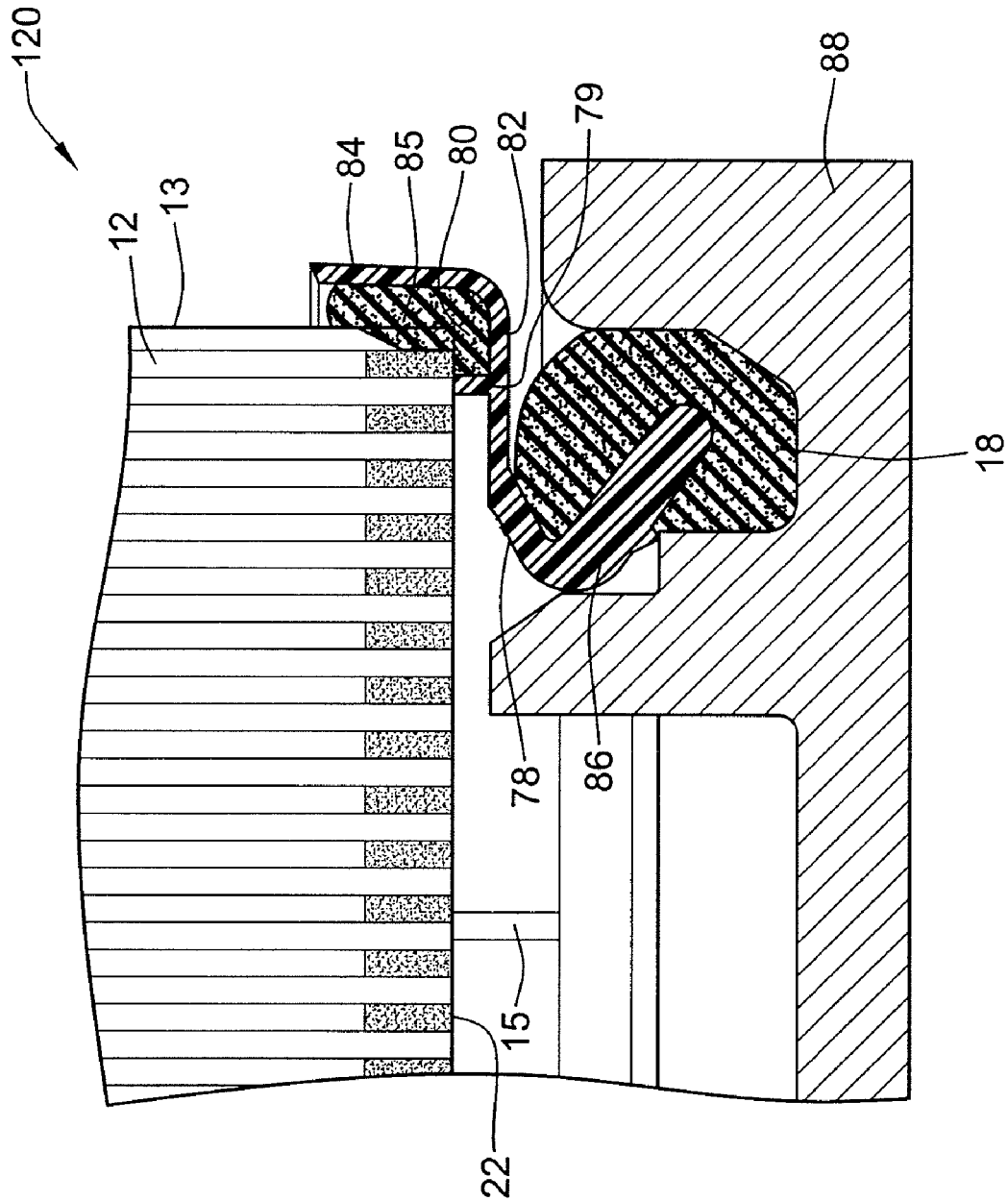
Figure 10:
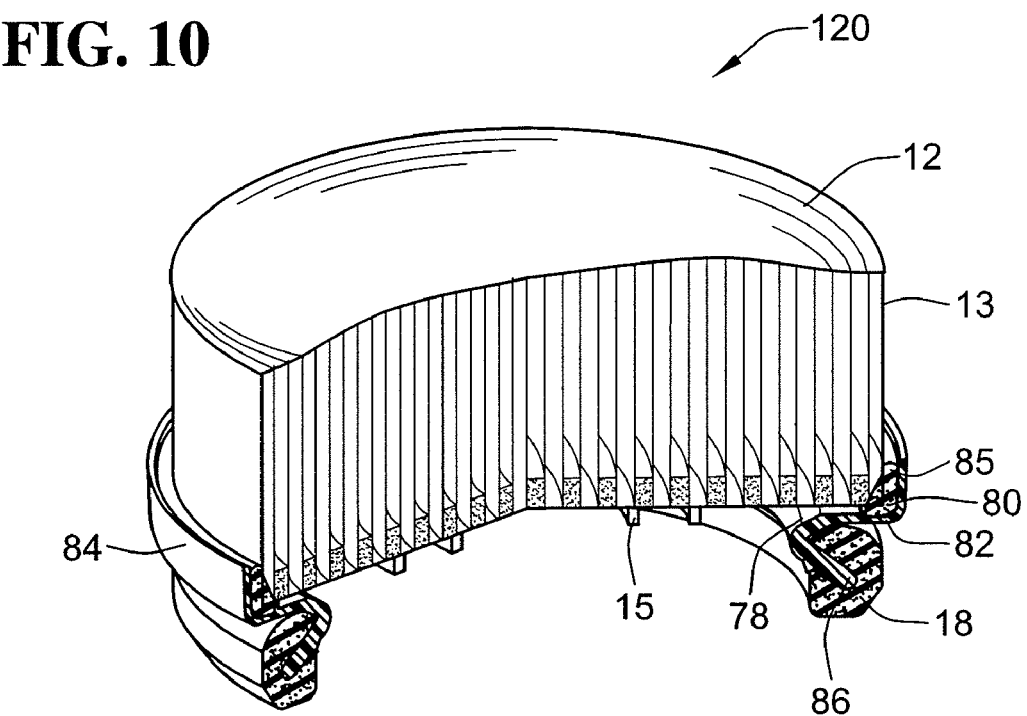
Figure 11:
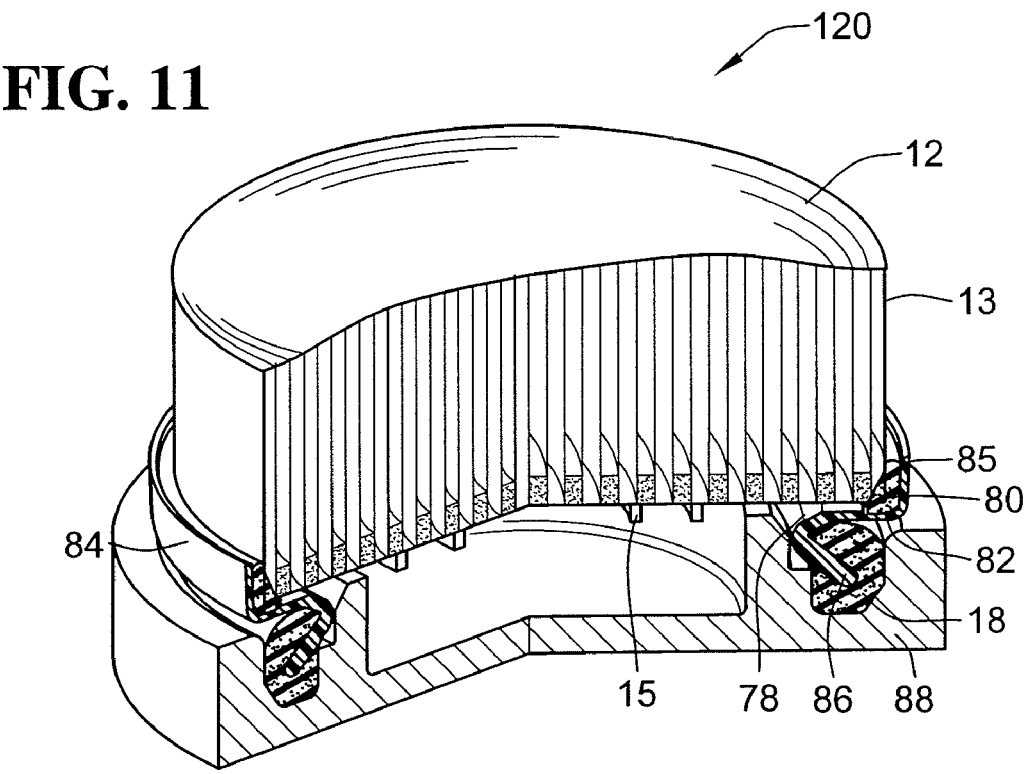
Figure 15:
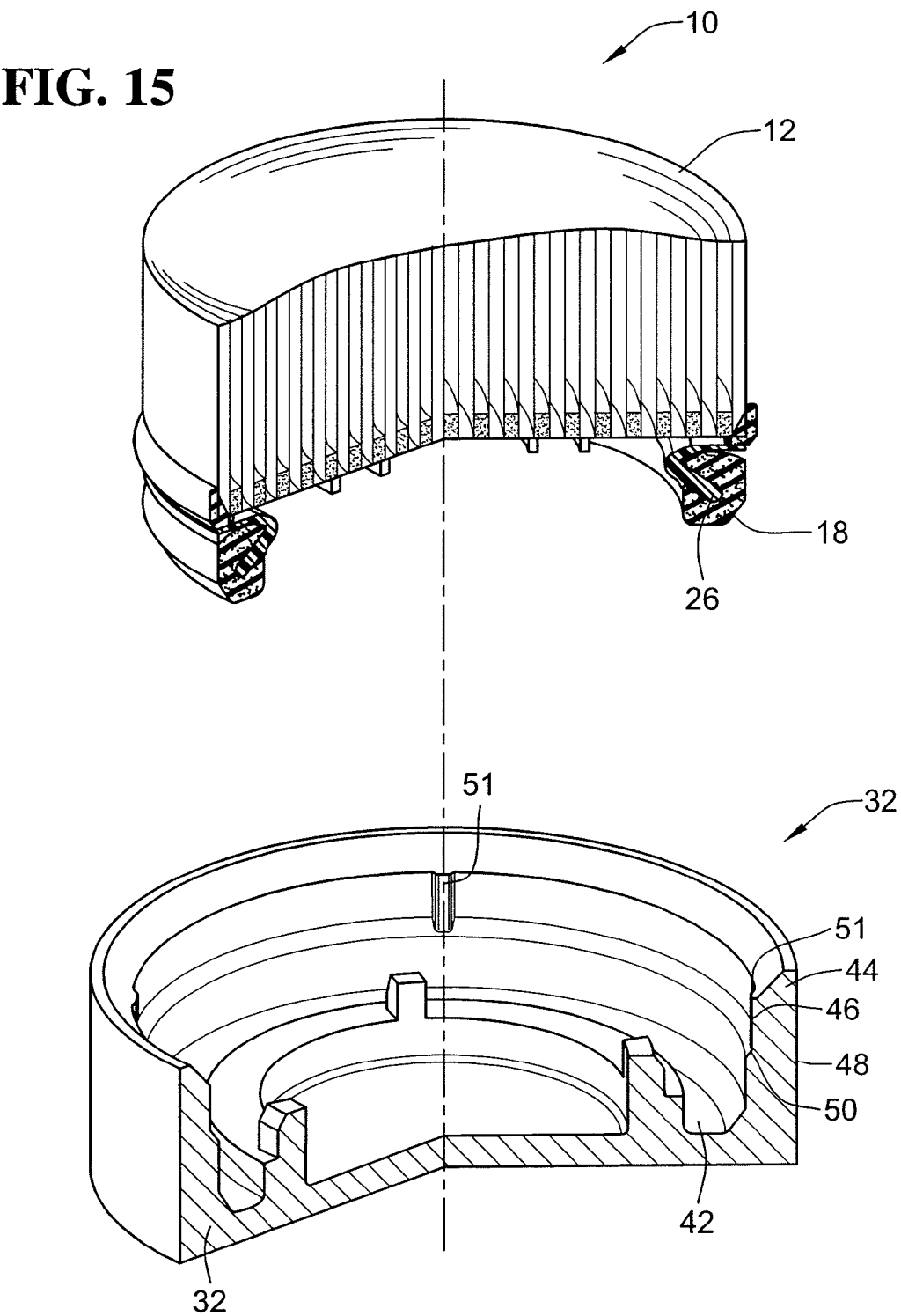
Figure 16:
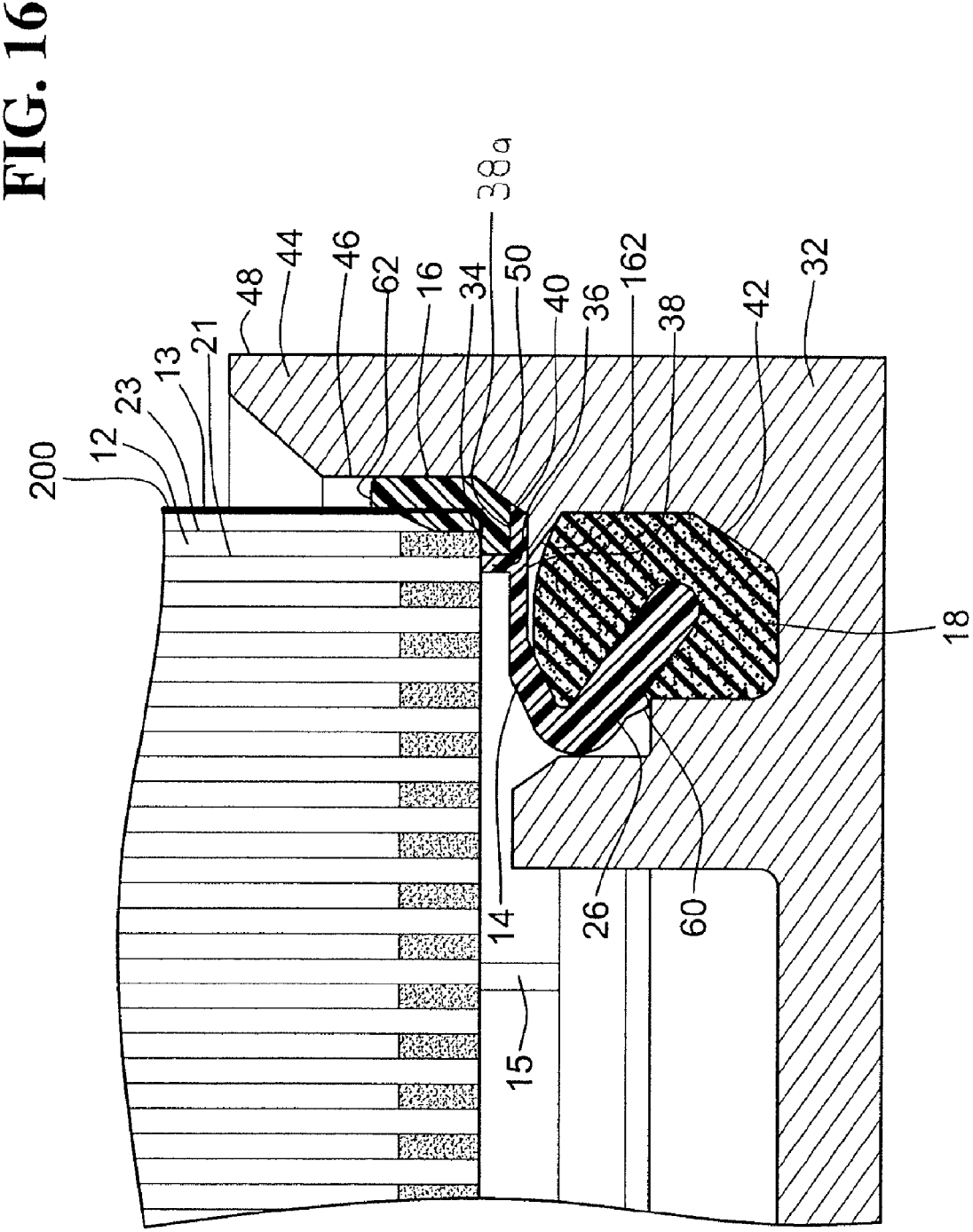
Figure 17:
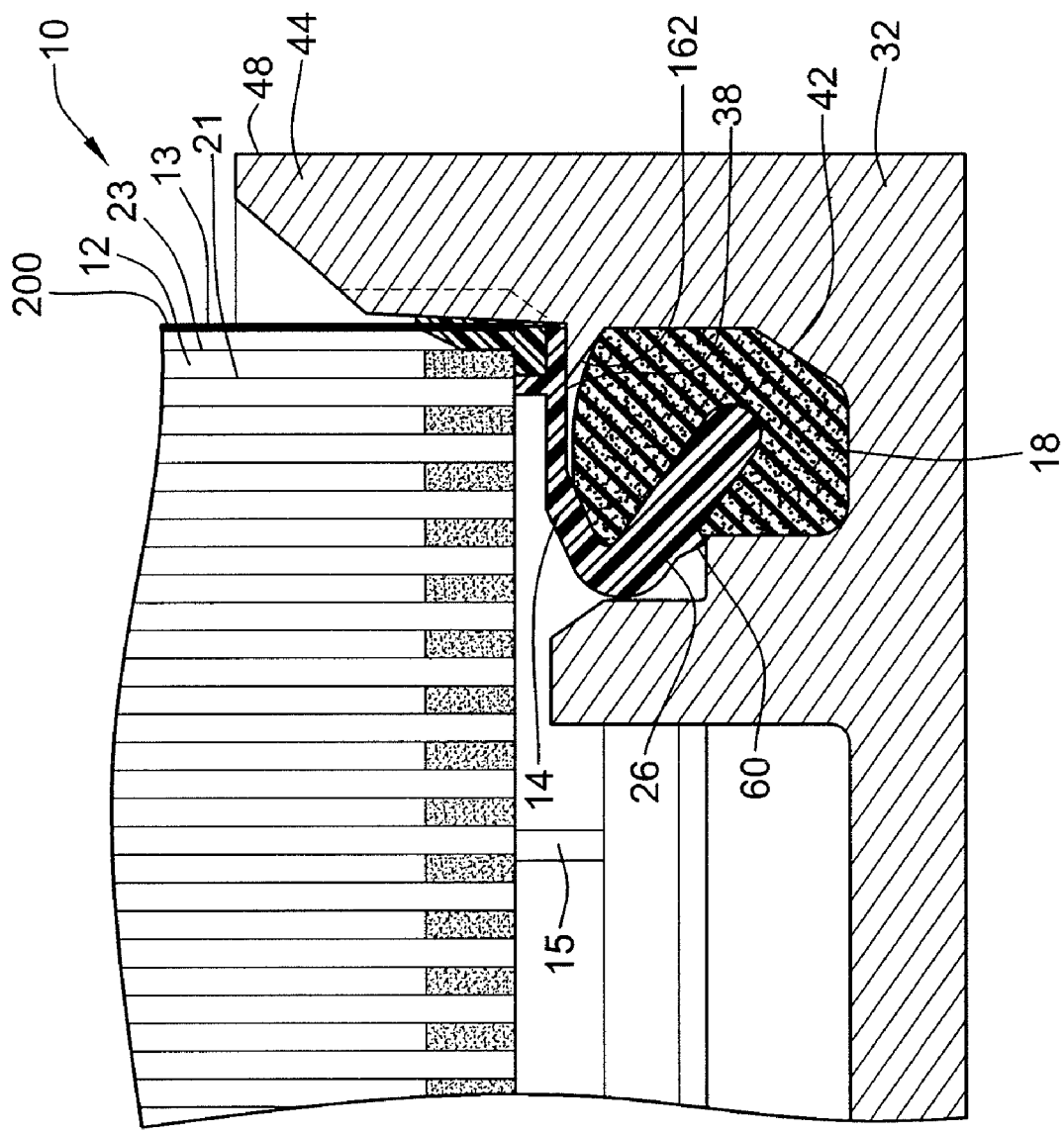
Figure 18:
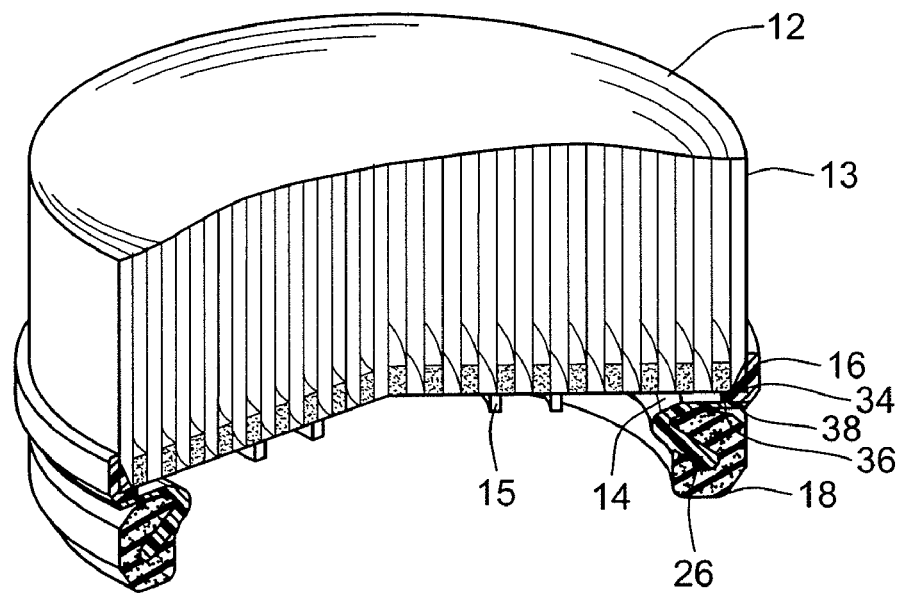
Figure 19:
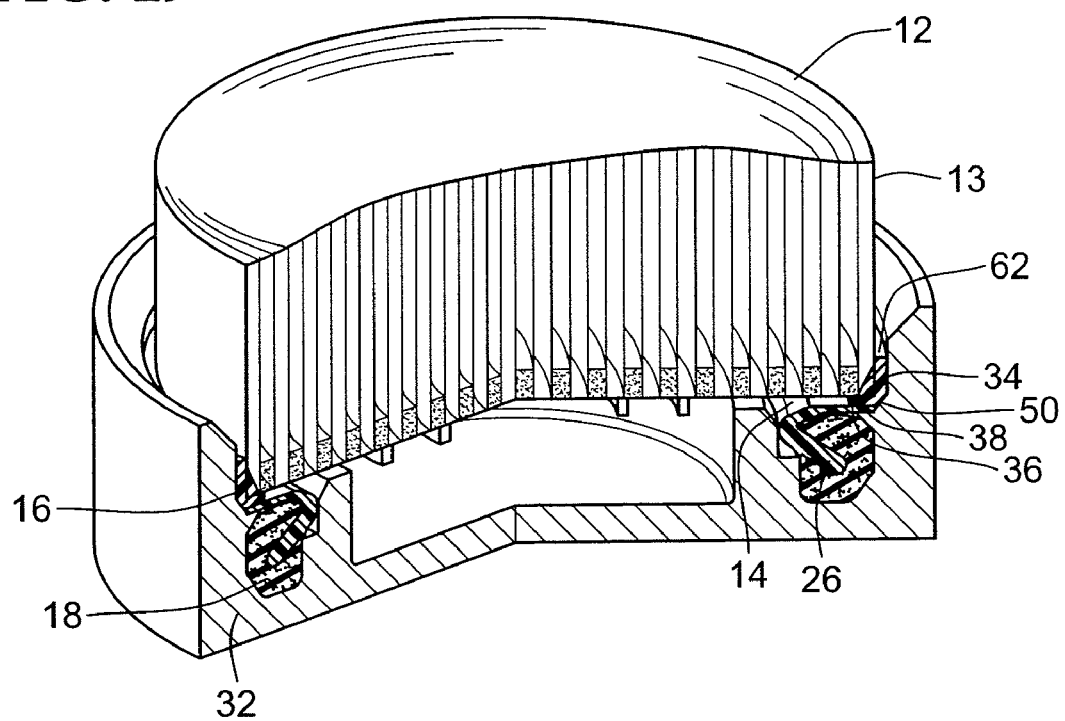
Figure 20:
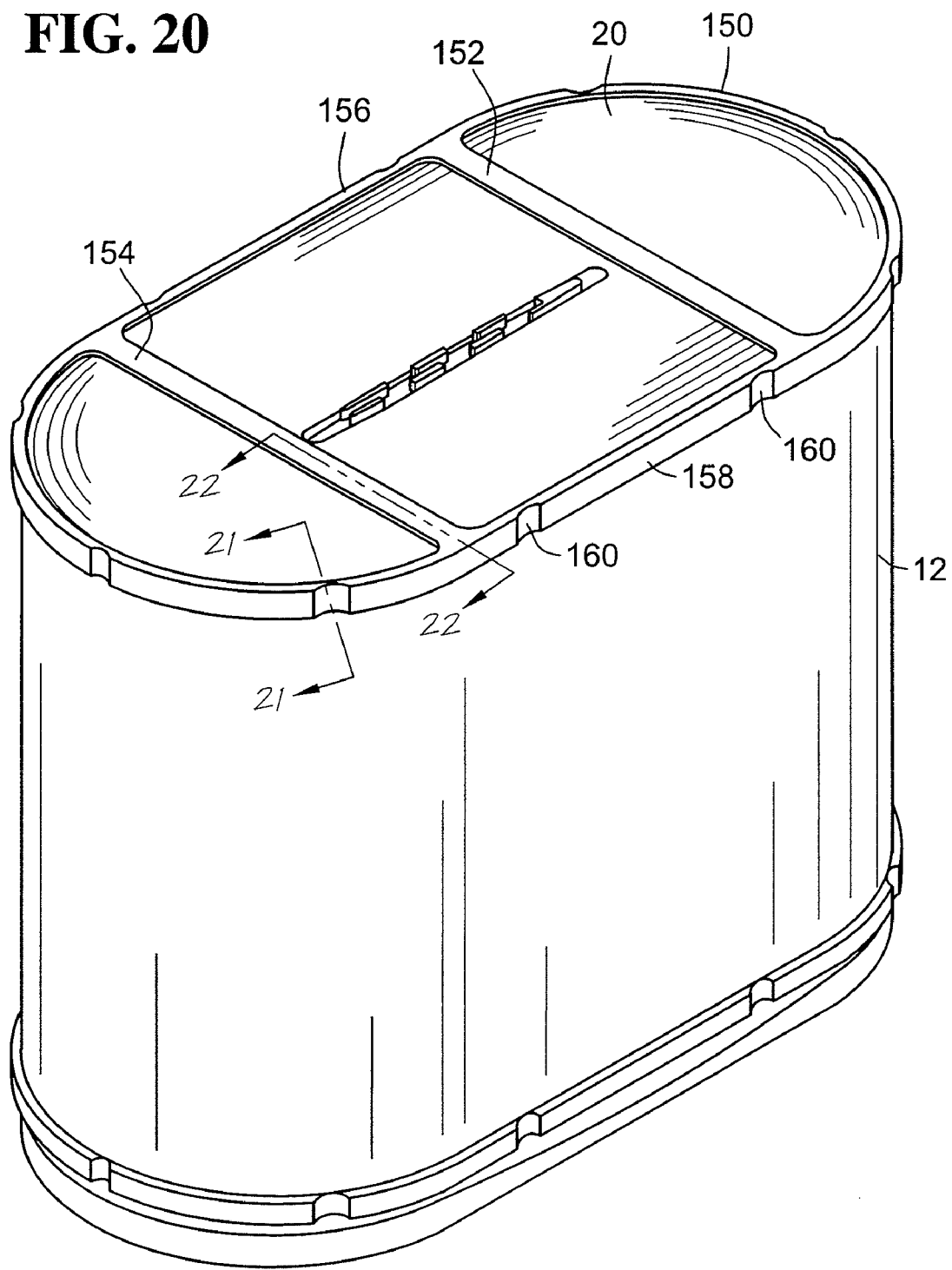
Figure 21:
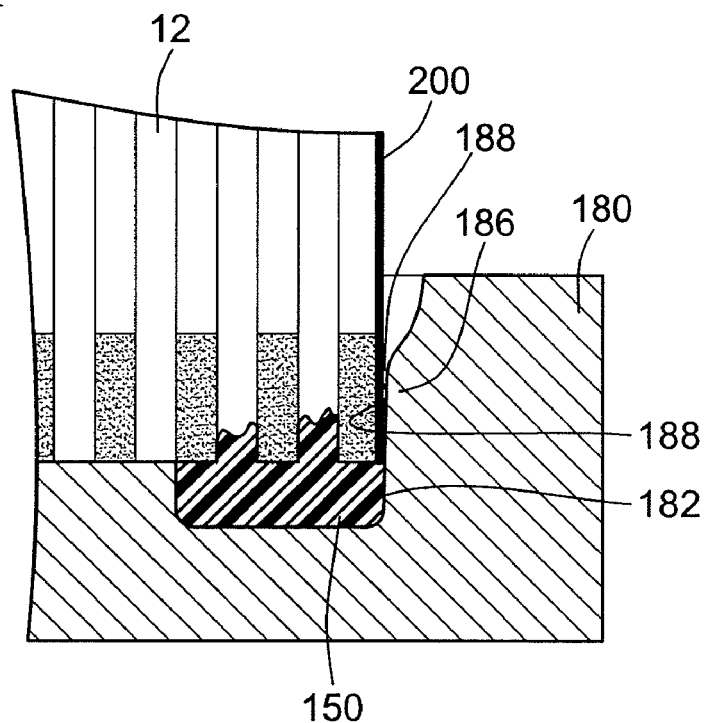
Figure 22:
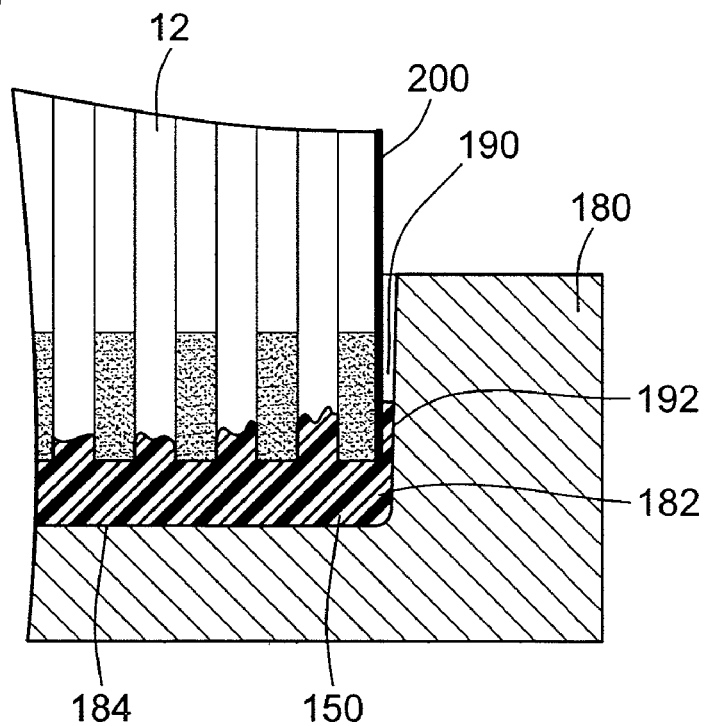
Figure 23:
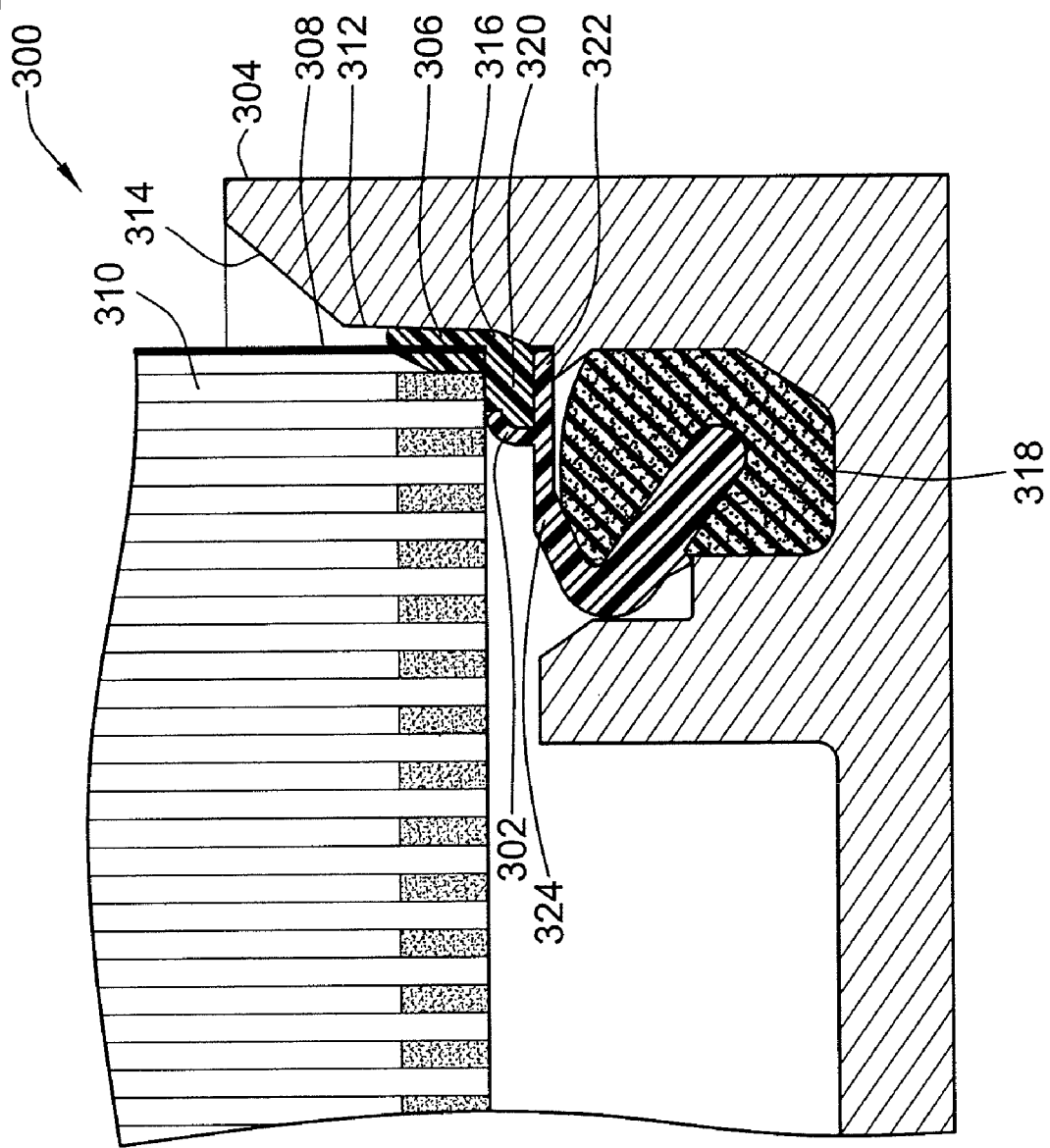
Figure 24:
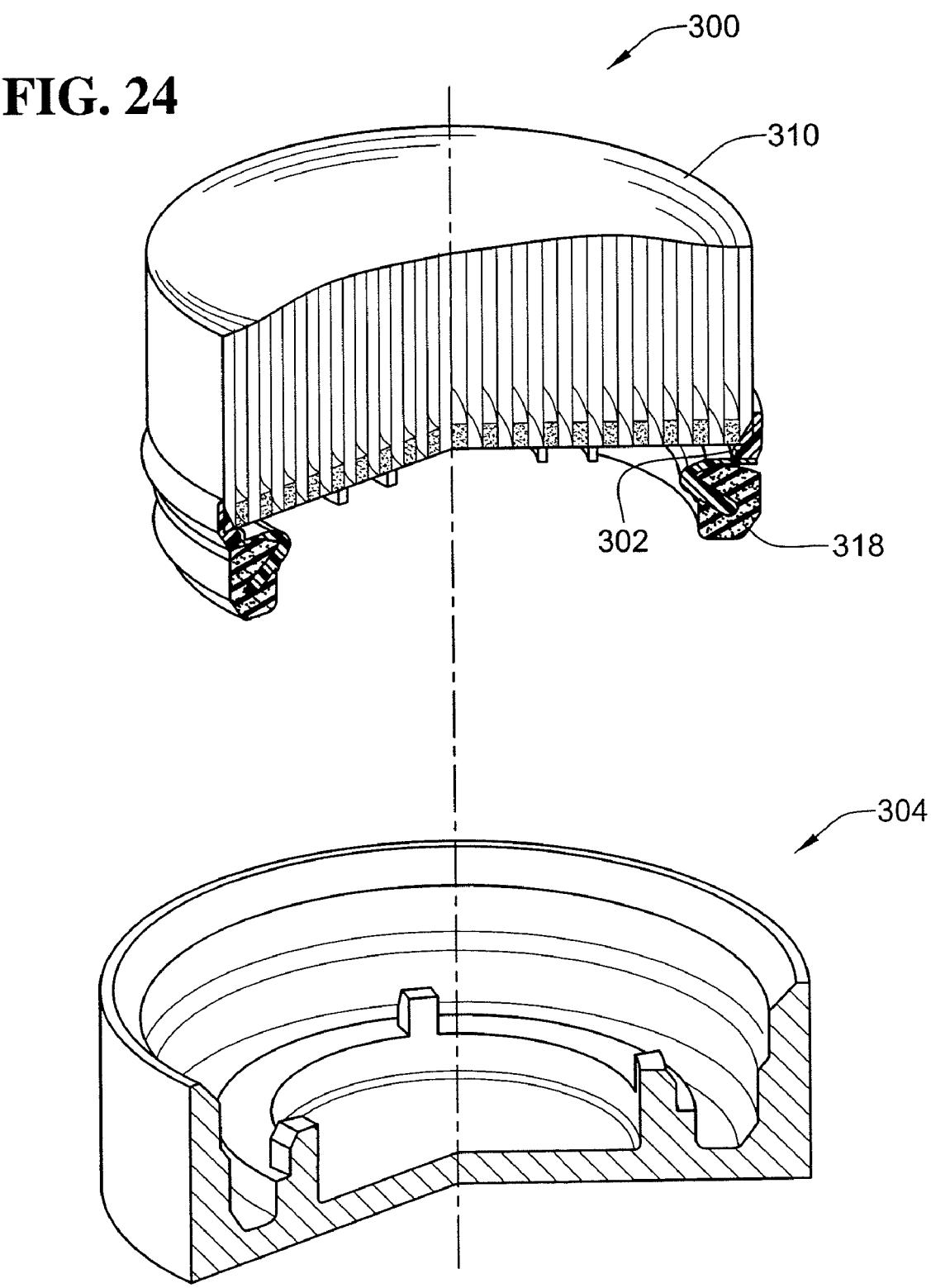

showing the filter media pack seal formed separately from the annular seal with a molding platform as a barrier between the seals;

FIG. 5 is the perspective partial cross-sectional and fragmentary view of the first embodiment in FIG. 4 shown in the mold wherein the filter media pack seal and the annular seal are formed;

FIG. 6 is a fragmentary and cross-sectional view of a second embodiment of the invention showing an annular seal formed in a mold, and an annular sealing interface between the filter media pack and a frame formed by plastic welding outer wraps of the filter media pack to the frame;

FIG. 7 is a perspective partial cross-sectional and fragmentary view of a lower portion of the second embodiment (e.g. the top portion of the filter media pack is cut away) showing the sealing interface formed between the filter media pack and the frame without using a sealing material, and an annular seal carried by the seal support portion of the frame;

FIG. 8 is the perspective partial cross-sectional and fragmentary view of the second embodiment in FIG. 7 shown in the mold wherein the annular seal is formed;

FIG. 9 is a fragmentary and cross-sectional view of a third embodiment of the invention showing a filter media pack seal formed in a molding receptacle portion of the frame, and an annular seal separately formed in a mold;

FIG. 10 is a perspective partial cross-sectional and fragmentary view of a lower portion of the third embodiment (e.g. the top portion of the filter media pack is cut away) showing the filter media pack seal enclosed by the molding receptacle portion and the annular seal separately carried by the seal support portion of the frame;

FIG. 11 is the perspective partial cross-sectional and fragmentary view of the third embodiment in FIG. 10 shown in the mold wherein the annular seal is formed;

FIG. 12 is a fragmentary and cross-sectional view of a fourth embodiment of the invention showing a frame with an adhesive bead applied continuously along an inner annular wall and an annular seal in a mold, carried by a seal support portion of the frame, before a filter media pack is inserted into the frame;

FIG. 13 is the fragmentary and cross-sectional view of the fourth embodiment in FIG. 12 as the filter media pack engages the adhesive bead after the filter media pack is inserted into the frame guided by a chamfer of the frame;

FIG. 14 is the fragmentary and cross-sectional view of the fourth embodiment in FIG. 12, after the filter media pack has completely traveled down the annular wall of the frame, showing an elongated adhesive bead between a periphery of the filter media pack and the inner annular wall of the frame, thereby sealing the filter media pack with the frame;

FIG. 15 is the perspective partial cross-sectional and fragmentary view of the first embodiment in FIG. 5 shown with the filter element removed from the mold after the filter media pack seal and the annular seal are formed;

FIG. 16 is a fragmentary and cross-sectional view of a fifth embodiment in a mold having an undercut, showing an arrangement of a filter media pack seal and a separately formed annular seal relative to a filter media pack and the frame;

FIG. 17 is a different fragmentary and cross-sectional view of the fifth embodiment of FIG. 16 in a mold having an undercut;

FIG. 18 is a perspective partial cross-sectional and fragmentary view of a lower portion of the fifth embodiment (e.g. the top portion of the filter media pack is cut away) showing the filter media pack seal formed separately from the annular seal with a molding platform as a barrier between the seals;

FIG. 19 is the perspective partial cross sectional and fragmentary view of the fifth embodiment in FIG. 17 shown in the mold with the undercut wherein the filter media pack seal and the annular seal are formed;

FIG. 20 is a perspective top view of an embodiment according to the present invention including a boarder frame integrally bonded to the filter media pack;

FIG. 21 is a fragmentary and cross-sectional view of the embodiment of FIG. 20 showing the frame formed in a mold and integrally bonded to the filter media pack;

FIG. 22 is a different fragmentary and cross sectional view of the embodiment of FIG. 20 showing the frame including ribs formed in a mold and integrally bonded to the filter media pack; and FIG. 23 is a fragmentary and cross-sectional view of a sixth embodiment in a mold having an undercut, showing an arrangement of a filter media pack seal and a separately formed annular seal relative to a filter media pack and the frame; and FIG. 24 is the perspective partial cross-sectional and fragmentary view of the first embodiment in FIG. 23 shown with the filter element removed from the mold after the filter media pack seal and the annular seal are formed.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
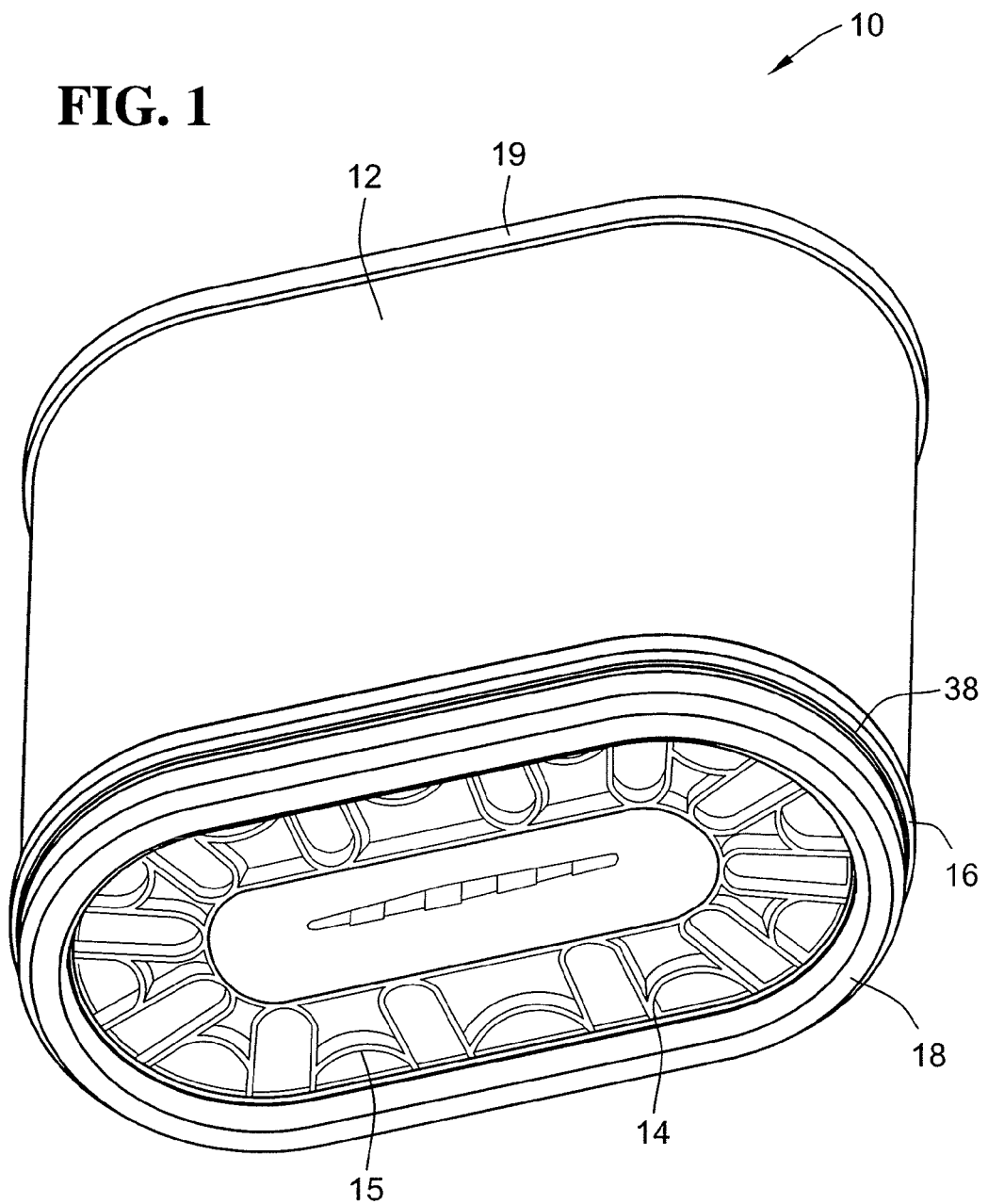
FIG. 1 is a perspective view of a filter element including separate seals according to a first embodiment of the invention, adapted for insertion into a filter housing.
Figure 2:
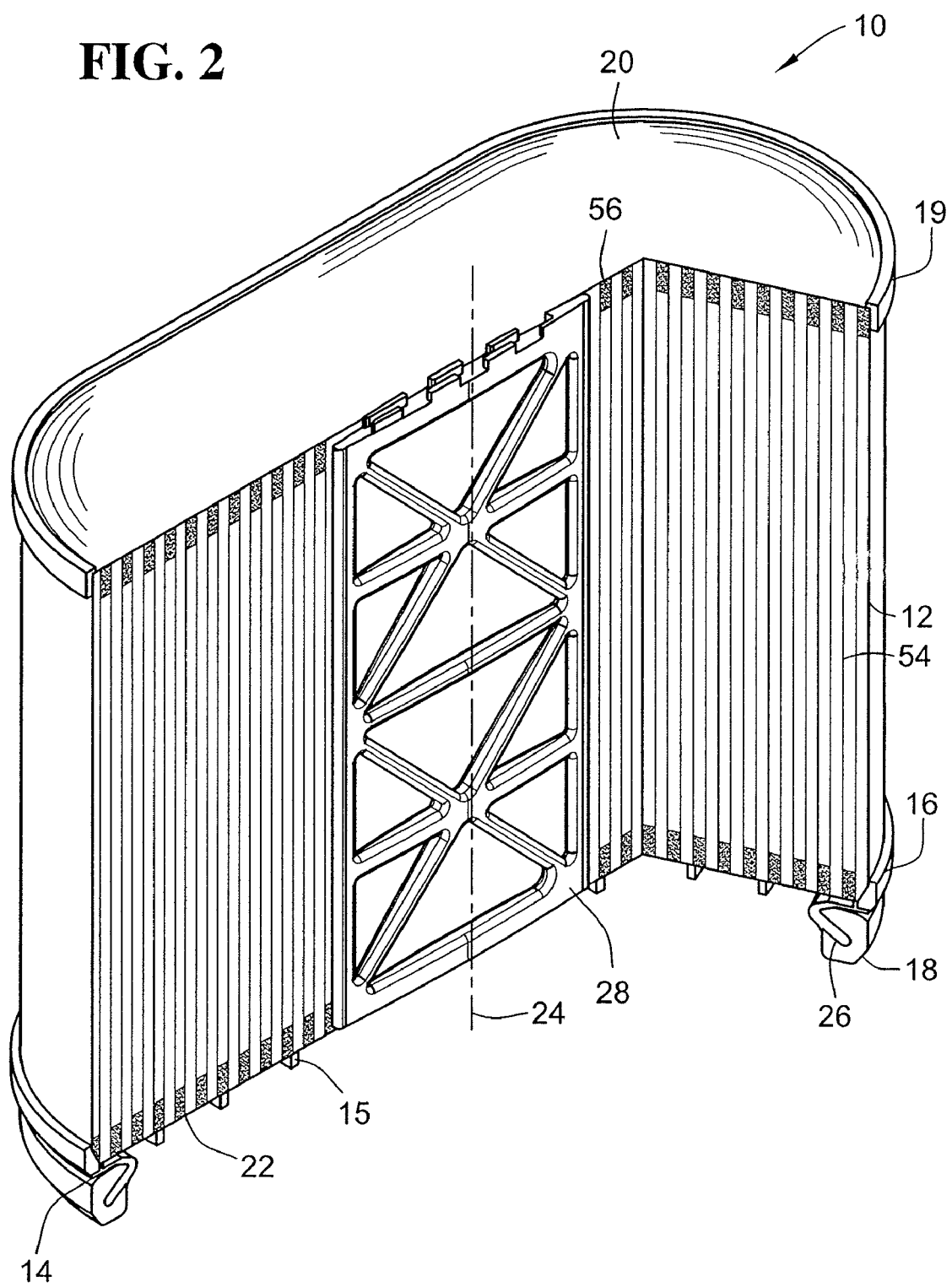
FIG. 2 is a perspective partial cross-sectional view of the first embodiment including a fluted filter media pack, a frame, a winding core, a border frame, an annular seal, and a filter media pack seal independent of the annular seal.

FIGS. 1 and 2 show a first embodiment of the present invention in the form of a filter element 10, adapted for insertion into a filter housing for removing particulate matter from a flow of fluid passing through the filter housing. The term fluid as used herein is intended to include fluids in either liquid or gaseous forms; however, the embodiments shown herein illustrate an air filter of the type used for filtering intake air for engine and air compressors. It is understood that inventive features may also be applicable to liquid applications.

The filter element 10 of the first embodiment is generally shown in FIGS. 1 and 2 as an annular shape with a race-track-like cross section. The term "annular" is used herein in accordance with the common dictionary definition to describe a variety of ring-like shapes disposed about an axis or centerline. Annular shapes, as contemplated by the inventors, may include, but are not limited to, shapes that are round, rectangular, oval, or race-track-like with two generally straight and parallel sides joined by rounded ends.

To generally introduce different components, the filter element 10, as shown in FIGS. 1 and 2, includes a filter media pack 12, a seal support frame 14 having a flow face grid 15, a filter media pack seal 16, an annular seal 18, a border frame 19, and a winding core 28.

Referring to FIGS. 1-5, the filter media pack 12 of the first embodiment is shown as a fluted filter media with a central axis 24 passing through opposed flow faces 20, 22. The fluted filter media pack 12 includes a face sheet 21 and a convoluted sheet 23 secured together and wound about the winding core 28 to define a plurality of flutes. First set of the plurality flutes are closed proximate an inlet flow face 20 and second set of the plurality of flutes are closed proximate an outlet flow face 22, such that fluids entering the flutes, which are open at the inlet flow face 20, flow through the porous filter media into other flutes prior to exiting the filter media at the outlet flow face 22 of the flutes. In alternative embodiments, the fluted filter media pack 12 may be formed without using the winding core 28.

The outer edge of the inlet flow face 20 can be protected by the border frame 19. The border frame 19 reduces risk of damages to the filter element 10 during handling or installation by providing a rim around the periphery of the filter media pack 12 at a corner thereof. As shown in FIGS. 1 and 2, the border frame 19 is a plastic ring member that can be glued or plastic welded to the filter media pack 12, or removably placed thereon. The border frame 19 may also be formed with any suitable materials including, but not limited to, urethane materials, other polymers, metal and the like.

FIG. 20 illustrates an alternative embodiment of the border frame. In this embodiment a border frame 150 is integrally bonded to the filter media pack 12. As shown in FIG. 20, the border frame 150 has ribs 152, 154. In addition to providing protection to the corner and outer edges of the inlet flow face 20, the border frame 150 includes the ribs 152, 154 that may also provide a structural support across the inlet flow face 20 and also prevent damage to inlet flow face. The border frame 150, as illustrated in FIG. 20, is race-track-like shaped including two parallel sides 156, 158. The ribs 152, 154 are integrally formed with the border frame 150 and extend from one side of the border frame 156 to the other side 158. The border frame 150 also includes a plurality of location reliefs 160 that extend inwardly to filter paper or protective wrap with or without a thin flash of urethane material coating (i.e. the mold is located against the outer periphery of filter media pack). Each of the plurality of location reliefs 160 is indented from the side surface of the border frame 150 and matches a corresponding locating rib of a mold as discussed in detail below. The border frame 150 is shown in FIG. 20 with ten location reliefs 160, wherein the location reliefs are generally spaced equally from one another with about a 3 inches space between them. However, other embodiments may include more or less number of location reliefs 160, which may or may not be spaced equally from each other.

The border frame 150 may be integrally bonded to the filter medial pack 12 via molding or plastic welding. Preferably, the border frame 150 is molded in a mold designed according to a desired shape of the border frame 150. FIGS. 21 and 22 show the border frame 150 molded to the filter media pack 12 in a mold 180 in fragmentary cross-sectional views. The mold 180 includes an annular cavity 182 and rib cavities 184 extending from one side of the annular cavity to the other side. The mold 180 also includes a plurality of locating ribs 186. As previously discussed, the border frame 150 is shown with ten location reliefs, thus the mold 180 for the border frame 150 will have ten corresponding locating ribs 186. The locating ribs are protrusions extending from an inner wall 192 of the mold 180 above the annular cavity. The locating ribs may be configured to have a rounded end or flat surface end which will form corresponding location reliefs 160.

During the molding process, an uncured fluid frame material such as an uncured rigid urethane is poured into the mold cavities 182, 184, and the filter media pack 12 is inserted. The filter media pack 12 is guided by the plurality of locating ribs 186 into the mold 180. The filter media pack 12 is generally centered in the mold 180 with a gap 188 between the periphery of the filter media pack 12 and each of the plurality of locating ribs 186. A size of the gap 188 between a locating rib and the filter media pack periphery may slightly vary from one locating rib to another. Occasionally, some locating ribs may push into the adjacent periphery of the filter media pack 12 leaving indentations, while other locating ribs are spaced from the periphery of the filter media pack 12 with a larger gap 188 than if the filter media pack 12 was centered in the mold 180. FIG. 21 illustrates the filter media pack 12 in the mold 180, cut across one of the locating ribs 186 showing the gap 188 between the locating rib 186 and the periphery of the filter media pack 12.

FIG. 22 also shows the filter media pack 12 in the mold 180, but cut across between locating ribs 186. As such, FIG. 22 shows a gap 190 between the inner wall 192 of the mold 180 and the periphery of the filter media pack 12. The size of the gap 190 is generally larger than the gap 188.

In the annular cavity 182, some of the uncured fluid frame material enters openings formed by some flutes along the outer wraps of the filter media pack 12. Similarly, some of the uncured fluid material in the rib cavities 184 extends into opening of some adjacent flutes. Additionally, the uncured fluid frame material in the annular cavity 182 extends up around the periphery of the filter media pack 12, partially entering the gap 188 and the gap 190. In the embodiments where the filter media pack 12 is off centered with some locating ribs pushed into the periphery of the filter media pack 12, the gap 188 at those locating ribs may be very minimal, yet the uncured fluid frame material still seeps between the pushed in locating ribs and the periphery of the filter media pack.

The uncured fluid frame material in the gap 188 and 190 cures to form the periphery of the border frame 150. A thickness of portions of the border frame 150 formed in the gap 190 is thicker than portions formed in the gap 188, since the gap 190 is larger than the gap 188. The portions of the border frame 150 formed in the gap 188 define the location reliefs 160. (See FIG. 20). The thickness of the periphery of the border frame 150 may vary from one point to another. As such, some portions of the border frame 150 may be flush with the periphery of the filter media pack 12, while other portions extend beyond the periphery of the filter media pack 12. As the uncured fluid frame material in the openings of some flutes, the gap 188 and the gap 190 cures, the border frame 150 is formed, integrally bonding with the filter media pack 12. Preferably the border frame embeds in the filter media pack either into the porosity of the filter paper, outer wrap thereof and/or by filling the flutes defined by the filter pack to provide secure attachment.

The border frame 150 can be formed of any suitable polymeric materials, preferably a rigid urethane which is advantageous in providing structural support for the filter media pack 12. When the border frame 150 is formed of a rigid urethane, it preferably does not perform a sealing function between the filter element 10 and the filter housing. In other embodiments, the border frame 150 may be formed of a softer material such as a softer polyurethane foam. Although, the above described border frame 150 includes the plurality of location reliefs 160 formed by the corresponding plurality of locating ribs 186, the border frame 150 may be formed without the plurality of locating ribs 186, thus no location reliefs may be found in those embodiments.

Alternatively, the border frame 150 may also be attached via plastic welding. In such an embodiment, the border frame 150 is formed at least in part of a suitable thermoplastic material, wherein one side of the border frame 150 is heated until soft, then the filter media pack 12 is centered on the border frame 150 and pressed against it such that some of the softened frame material oozes through openings of adjacent flutes. As such, the filter media pack 12 is partially embedded in the border frame 150. The border frame 150 and the filter media pack 12 are secured together as the softened frame material solidifies as it is cooled.

In the embodiment shown in FIG. 20, the securely attached border frame 150 having the ribs 152, 154 protects and provides structural support to the filter media pack 12 on the inlet flow face 20, while the support frame 14 having a flow face grid 15 supports the outlet flow face 22. Such structural support on both flow faces 20, 22 holds and retains the shape of the filter media pack 12 by preventing telescoping and protects the flow faces 20, 22 from damages during handling and installation. Although, the border frame 150 of FIG. 20 only includes two ribs 152, 154, other embodiments may include one or more than two ribs.

Now referring back to FIGS. 1-5, at the other end of the filter media pack 12, a seal support frame 14 is provided for carrying the annular seal 18 for engaging the filter housing. The outlet flow face 22 and/or outer side of the filter media pack 12 is secured to the seal support frame 14 by the filter media pack seal 16 that circumscribes and bonds the filter media pack 12. The seal support frame 14 typically includes the flow face grid 15 extending across the outlet flow face 22 of the filter media pack 12. The flow face grid 15 is provided to resist pressure forces acting on the filter media pack 12, which could cause the center of the filter media pack 12 to telescopically bow outward in a downstream direction. Such flow face grid 15 extending across the outlet flow face 22 may be particularly beneficial for fluted filter media packs formed by coiling layers of convoluted filter material, in order to prevent the center of the filter media pack 12 from telescoping under high inlet fluid pressures.

Figure 3:
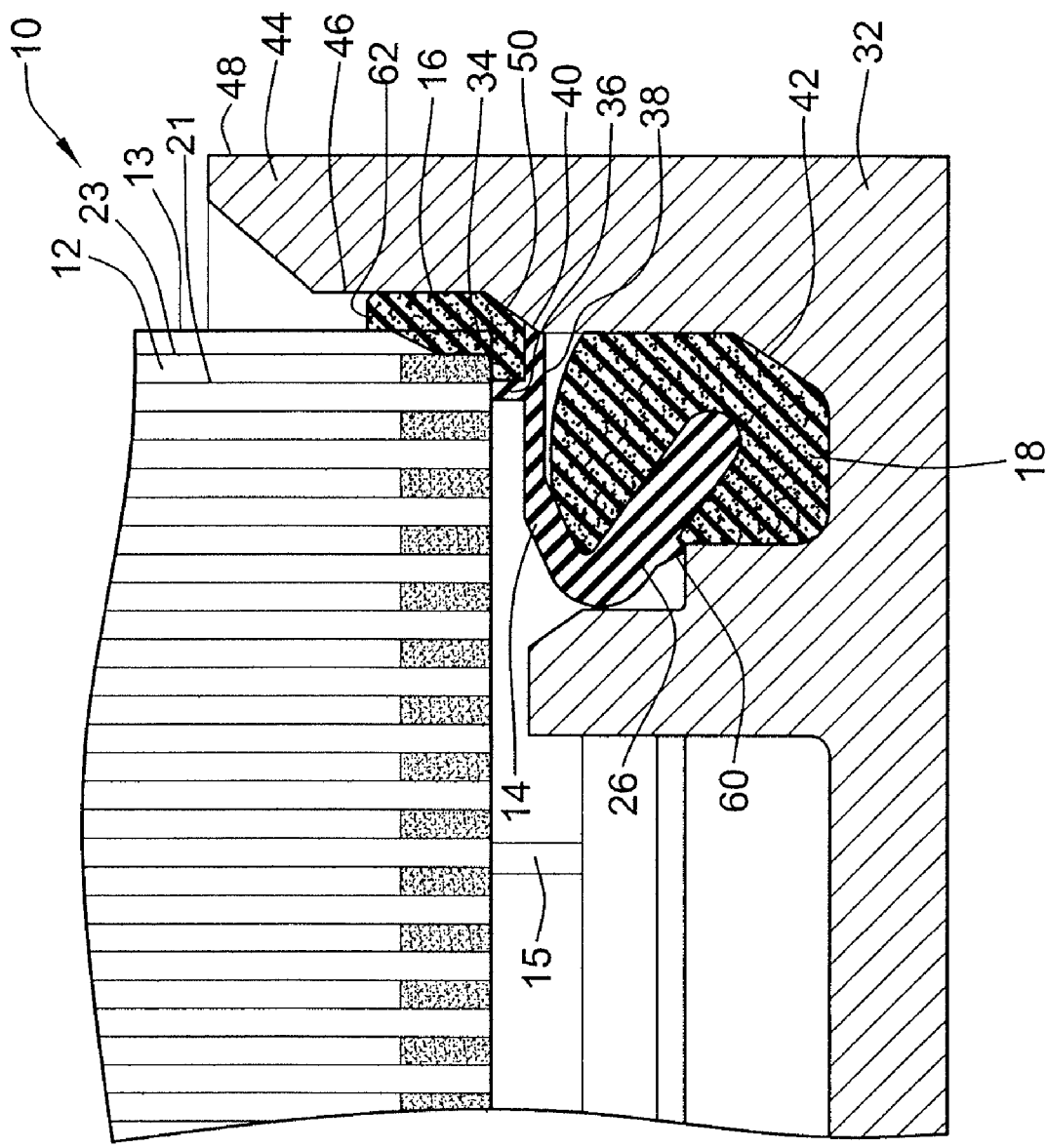
FIG. 3 is a fragmentary and cross-sectional view of the first embodiment depicted in FIGS. 1 and 2, in a mold, showing an arrangement of the filter media pack seal and the separately formed annular seal relative to the filter media pack and the frame.

In addition to performing a securing function, the filter media pack seal 16 seals an annular interface between the filter media pack 12 and the seal support frame 14. The seal support frame 14 includes a spacer 36 and a molding platform 38 defining a portion of a molding receptacle region 34 as shown in FIGS. 3-5. The spacer 36 and the molding platform 38 act as barriers containing the filter media pack seal 16 within the molding receptacle region 34. The spacer 36 also allows the seal material of the filter media pack seal 16 to undercut and seal outer wrap or wraps of the filter media pack 12. The filter media pack seal 16 further extends around an outer periphery of the filter media pack 12 proximate the annular interface and seals the annular interface.

The seal support frame 14 further includes a seal support portion 26 wherein the annular seal 18 is formed and supported. The primary function of the annular seal 18 is to provide a sealing surface between the filter element 10 and the filter housing to prevent unfiltered fluids from passing between the filter element 10 and the filter housing. The filter housing often includes a generally tubular wall section. In order to facilitate removal and replacement of the filter element 10, the filter element 10 is provided with the annular seal 18 which is compressible for inserting the filter element 10 into the filter housing. When the filter element 10 is inserted into the filter housing, the annular seal 18 seals an interface between an inner surface of the tubular wall section and the filter element 10, thereby preventing fluids from bypassing the filter element 10 while flowing through the filter housing.

The filter media pack seal 16 and the annular seal 18 may be molded from any suitable sealing materials including but not limited to polymeric materials and polymer foams, preferably, polyurethane foam. The seals 16, 18 may be formed using the same material or may be formed from two different materials. Moreover, the filter media pack seal 16 may provide an additional sealing surface between the filter element 10 and the filter housing while securing and sealing the interface between the filter media pack 12 and the frame 14 at the same time.

The filter media pack seal 16 and the annular seal 18 are formed in a mold 32 in the first embodiment. FIG. 3 shows a mold 32 in conjunction with the sealing frame region to illustrate how the filter media pack seal 16 and the annular seal 18 can be formed separately. Referring to FIGS. 3 and 5, the mold 32 includes an annular cavity 42, a peripheral wall 44 which has an inner wall 46 and an outer wall 48, and locating ribs 51. The inner wall 46 includes a tapered region 50 adapted for abutting the molding platform 38 of the support frame 14, defining a portion of the molding receptacle region 80.

The molding platform 38 includes a flange portion 38a with a terminal free edge which has a chamfered seating surface 40 adapted to abut the tapered region 50. The chamfered seating surface 40 is designed to position the seal support frame 14 as the frame 14 is inserted into the mold 32, such that the seal support portion 26 is placed in an annular cavity 42 of the mold 32, and the chamfered seating surface 40 is supported against the tapered region 50 of the mold 32. When the frame 14 is positioned as such that the chamfered seating surface 40 abuts the tapered region 50, the molding receptacle region 34 is defined by the spacer 36, the molding platform 38 and the inner wall 46 of the mold 32

A method of making the filter element 10 of the first embodiment, as illustrated in FIGS. 1-5, can include steps of forming the filter media pack 12, molding the seal support frame 14 from plastic material to provide the seal support portion 26 and a portion of the mold receptacle region 34, molding of an annular seal 18 on the seal support portion 26, and separately molding a filter media pack seal to secure and seal the filter media pack 12 to the seal support frame 14. The filter media pack 12 may be constructed from a convoluted sheet of porous filter media 23 secured together with a face sheet 21 of porous filter media. The convoluted sheet 23 may be formed by any appropriate process, such as corrugating or pleating, but preferably by gathering as described in U.S. patent application Ser. No. 10/979,390, entitled "Gathered Filter Media for an Air Filter and Method of Making Same," assigned to the Assignee of the present invention, and incorporated herein by reference.

The term face sheet, as used herein, is intended to encompass any form of sheet or strip of generally flat, porous or non-porous, material attached to the convoluted sheet of porous filter material. In most embodiments of the invention, the face sheet would preferably be formed of a porous filter material.

The convoluted sheet of porous filter material 23 forms a plurality of contiguous adjacent convolutions, commonly known in the industry as flutes 54. Selected ends of the flutes may be blocked, with a bead of adhesive 56, for example, to cause fluid entering one end of some of the flutes to flow through the porous filter media into other flutes prior to exiting the filter media at an opposite end of the flutes, in the manner known in the art.

The filter media pack 12 in FIGS. 1-5 is formed by winding and coiling the filter media to form a generally annular shape, such as a race-track-like cross section, that is proportioned for insertion into a filter housing having a generally same inner surface shape with a larger perimeter than the filter element 10 to provide a sliding clearance fit. The filter media pack 12 may be constructed with the winding core 28 as disclosed in U.S. patent application Ser. No. 11/634,647, entitled "Fluid Filter Apparatus Having Filter Media Wound About a Winding Frame," assigned to the Assignee of the present invention, and incorporated herein by reference. In other embodiments of the invention, the filter media pack 12 having other cross-sectional shapes, such as circular, square, rectangular, or polygonal, for example, may be utilized by coiling or bonding together successive wraps of the filter media. It is also understood that the invention is not limited to a filter media pack of fluted media. Those having skill in the art will readily recognize that the invention may also be practiced with efficacy, using other types of filter media.

Still referring to FIGS. 1-5, the seal support frame 14 is preferably molded of a suitable plastic material. The flow face grid 15 may be formed integrally with the seal support frame 14. The first embodiment in FIGS. 1-5 depicts the filter element 10 with the seal support frame 14 integrally formed with the flow face grid 15 secured against the outlet flow face 22. However, alternative embodiments may include the flow face grid 15 formed independently from the frame 14, or may include the flow face grid 15 secured against both flow faces or the inlet flow face 20.

The embodiment shown in FIGS. 1-5 shows the annular seal support 26 as a canted annular extension projecting from the outlet flow face 22 at an oblique angle to the central axis 24. The canted extension may include a plurality of holes with the annular seal 18 including a portion thereof extending through the holes to help retain the annular seal 18 on the seal support portion 26 as disclosed in U.S. patent application Ser. No. 10/979,876, entitled "Filter Element with Canted Seal Support," assigned to the Assignee of the present invention, and incorporated herein by reference. The frame 14 includes the spacer 36 and the molding platform 38 with the chamfered seating surface 40 defining a portion of the molding receptacle region 34 as described above.

The annular seal 18 can be molded around the seal support portion 26 of the seal support frame 14 in the mold 32 having the annular cavity 42. In a molding process, an uncured fluid sealing material for the annular seal is poured into the annular cavity 42. The frame 14 is then inserted into the mold 32 with the seal support portion 26 facing downward as shown in FIGS. 3 and 5. When the seal support frame 14 is inserted into the mold 32, the chamfered seating surface 40 of the molding platform 38 slides down on the tapered region 50 of the mold inner wall 46, positioning the frame 14 such that the seal support portion 26 is in the annular cavity 42 and the chamfered surface 40 of the molding platform 38 abuts the tapered region 50 along a continuous annular interface to prevent seepage of seal material thereby while in an uncured state.

In the annular cavity 42, the uncured fluid sealing material is allowed to foam and rise up around the seal support portion 26. The seal support portion 26 also may include an annular rib 60 extending therefrom, as shown in FIG. 3, for contacting and sealing against the mold 32, thereby limiting the extent of the annular seal 18 along the support portion 26. The uncured fluid sealing material may include, but not limited to, various foaming polymers such as polyurethane. The uncured fluid sealing material foams around the seal support portion in a shape of an inner surface of the annular cavity 42, forming the annular seal 18. It is desirable that the uncured fluid sealing material cures into a sealing material having an elasticity characteristic suitable for sliding the filter element 10 in and out of the filter housing, and also providing a sealing surface between the filter element 10 and the filter housing, thereby preventing unfiltered fluids from passing between the filter element 10 and the filter housing.

When the seal support frame 14 is placed in the mold 32 for molding of the annular seal 18, as described above, the molding receptacle region 34 is formed by the spacer 36, the molding platform 38 and the mold inner wall 46. The interface between the seal support frame 14 and the mold inner wall 46 is closed when the chamfered seating surface 40 of the molding platform 38 abuts against the tapered region 50 of the mold inner wall 46. The molding receptacle region 34 is divided from the annular cavity 42 by the molding platform 38, thereby allowing the filter media pack seal 16 to form separately from the annular seal 18.

During a molding process of the filter media pack seal 16, an uncured fluid sealing material for the filter media pack seal 16 is poured into the molding receptacle region 34, then the filter media pack 12 is inserted into the mold 32. A plurality of angularly spaced locating ribs 51 of the mold 32 (FIGS. 3 and 15) guides the filter media pack 12 such that the filter media pack 12 is generally centered onto the frame 14 with the outer most wrap or wraps of the filter media pack 12 in the molding receptacle region 34. The filter media pack 12 is positioned such that the filter media pack 12 is spaced from the mold inner wall 46 with generally an even annular space 62 between the outer periphery of the filter media pack 12 and the inner wall 46 of the mold 32.

The plurality of the locating ribs 51 can eliminate a stacking tolerance effect during the molding process. That is, when the filter media pack 12 is inserted onto the seal support frame 14 without the plurality of the locating ribs, there are two process tolerances to control during the molding process: a tolerance between the periphery of the filter media pack 12 and the mold 32, and a tolerance between the filter media pack 12 and the seal support frame 14. Thus, the position of the annular seal 18 relative to the filter media pack 12 is controlled through two tolerances, resulting in an increased process tolerance between the annular seal 18 and the filter media pack 12. The plurality of the locating ribs 51 allows placement of the filter media pack 12 on the seal support frame 14 to be controlled under one tolerance, the tolerance between the locating ribs 51 and the periphery of the filter media pack 12, thus eliminating the stacking tolerance effect for a more controlled molding process.

In the molding receptacle region 34, the uncured fluid sealing material is allowed to foam, extending into openings formed by some flutes along the outer wraps of the filter media pack 12, and rise up around an annular interface between the filter media pack 12 and the seal support frame 14, and further circumscribing a portion of the outer periphery 13 of the filter media pack 12 proximate the interface. Both of these regions provide seals extending continuously around the filter media pack 12. The spacer 36 acts as a barrier to limit the uncured sealing material from extending radially inward beyond the outer wraps of the filter media pack 12, and allows the sealing material to undercut and seal the outer wrap or wraps of the filter media pack 12.

As the uncured fluid sealing material foams and cures, the filter media pack seal 16 is formed following the contours of the adjacent inner wall 46 of the mold 32. In this embodiment, an outer periphery of the filter media pack seal 16 includes a tapered region extending into a larger periphery as defined by the tapered region 50 and the larger diameter portion of the inner wall 46. Preferably, the minimum radial thickness of the filter media pack seal 16 (e.g. minimum distance between the outer side of the filter media pack 12 and the inner wall 46 of the mold 32, not including any locating ribs, if any) is typically between minimum 0.03 inches and 0.2 inches to allow sufficient room for a suitable molding pour and foaming opening.

In other embodiments, the outer periphery of the filter media pack seal 16 may vary with different inner surface shape molds. The embodiment illustrated in FIGS. 1-5 shows the spacer 36 as extending perpendicularly between the outlet flow face 22 of the filter media pack 12 and the molding platform 38. However, in other embodiments, the spacer 36 may extend in an oblique angle either angled toward or away from the central axis 24. The filter media pack seal 16 in this embodiment is formed independent of the annular seal 18 with the molding platform 38 as a barrier between them.

The uncured fluid sealing material for the filter media pack seal 16 may be one of the materials described above for the annular seal material. The filter media pack seal 16 and the annular seal 18 may be molded using a same material or two different materials. In the embodiment described above, the annular seal 18 and the filter media pack seal 16 are molded in the same mold 32, with the annular seal 18 molded first. FIG. 15 shows the filter element 10 removed from such mold 32 after the filter media pack seal 16 and the annular 18 are molded in the mold 32. In other embodiments, the filter media pack seal 16 and the annular seal 18 may be molded in two different molds in two separate molding processes.

FIGS. 6-8 illustrate a second embodiment of the present invention. Components of the filter element 110 of this embodiment are similar to those described in the first embodiment, and includes the filter media pack 12, the frame 66, and the annular seal 18. However, in this embodiment, an annular sealing interface between the filter media pack 12 and the frame 66 is formed by welding the filter media pack 12 to the frame 66 using a plastic welding process, rather than the filter media pack seal 16 of the first embodiment. Plastic welding is, thus, used to attach and secure a frame to a fluted filter media pack and may also form an annular seal therebetween.

The frame 66 of this embodiment includes the seal support portion 68, which remains the same as described above for the first embodiment, and an annular plastic portion 70 for plastic welding the outer wraps of the filter media pack 12. Therefore, in this embodiment, the frame 66 is formed at least in part from a plastic material suitable for a plastic welding process. As shown in FIGS. 6-8, the annular plastic portion 70 is formed around the outer periphery of the frame 66, and includes a welding portion 72 formed from a polymeric material suitable for a plastic welding process, and a safety portion 74. In other embodiments, a plastic welding portion of the frame 66 can be attached continuously around the outer side of the filter media pack 12.

As shown in FIG. 6, the outer wraps of the filter media pack 12 are embedded in the welding portion 72 located around the inner diameter of the annular plastic portion 70, leaving a safety portion 74 to extend beyond the outer periphery 13 of the filter media pack 12. As the filter media pack 12 is embedded into the welding portion 72, the safety portion 74 remains and circumscribes the outer periphery 13 of the filter media pack 12. An axial extension of the circumscribing safety portion 74 beyond the outlet flow face 20 of the filter media pack 12 equals the embedded length of the filter media pack 12. The outer wraps of the filter media pack 12 embedded in the welding portion 72 of the frame 66 defines the annular sealing interface between the filter media pack 12 and the frame 66.

All other components of the second embodiment remains the same as those components of the first embodiment as described above.

A method of making the filter element 110 of the second embodiment can include steps of forming the filter media pack 12, manufacturing the frame 66, molding the annular seal 18 on the seal support portion 68, and securing the filter media pack 12 against the frame 66. The process of forming the filter media pack 12 remains the same as described above in the method of making the first embodiment. The process of manufacturing the frame 66 also remains largely the same, except the frame 66 in this embodiment includes the annular plastic portion 70 thick enough to facilitate embedding instead of the molding receptacle region 34 of the first embodiment. The frame 66 of the second embodiment is constructed at least in part from a plastic material, because the annular plastic portion 70 is formed from a plastic material suitable for a plastic welding process, as discussed above.

The process of molding the annular seal 18 is the same as the process described above in the method of making the first embodiment. However, the mold 76 in this embodiment may be constructed only for molding of the annular seal 18 without the peripheral wall 44 for separately molding the filter media pack seal 16. The mold 76 in the first embodiment may also be utilized in this embodiment to mold the annular seal 18 around the seal support portion 68. The annular seal 18 in this embodiment may be molded before or after securing the annular interface between the filter media pack 12 and the frame 66.

The step of securing the filter media pack 12 and the frame 66, in this embodiment, involves a plastic welding process to embed the outer wraps of the filter media pack 12 in the annular plastic portion 70 of the frame 66. In one method of securing the interface between the filter media pack 12 and the frame 66, the annular plastic portion 70 is heated until the plastic material in the welding portion 72 becomes soft enough to embed the outer wraps of the filter media pack 12. Then the filter media pack 12 is centered onto the frame 66 such that outer wraps of the filter media pack 12 are on the heated welding portion 72. After the filter media pack 12 is centered on the frame 66, a light pressure may be applied evenly across the first flow face 20, causing the outer wraps of the filter media pack to push axially into the heated welding portion 72, without distorting or damaging the filter media pack 12.

The annular plastic portion 70 may be heated using any of the conventional plastic welding methods. For example, a hot air welder, also commonly referred to as a heat gun, may be used to heat the annular plastic portion 70. In such hot gas welding process, a heat gun is used to apply a jet of hot air or gas to the annular plastic portion 70 until the plastic in the welding portion 72 becomes soft enough for the embedding process. Alternatively, the annular plastic portion 70 may be heated with high frequency electromagnetic waves, also known as induction heating.

Ultrasonic welding or other similar friction welding processes may also be utilized. In an ultrasonic welding process, the filter media pack 12 and the frame 66 are placed in an ultrasonic welding equipment wherein they are exposed to a high-frequency, low-amplitude vibration between 15 KHz to 40 KHz. The ultrasonic energy generated by the vibration heats a contact area between the filter media pack 12 and the annular plastic portion 70 and welds the filter media pack 12 to the welding portion 72 of the frame 66.

FIGS. 9-11 illustrate a third embodiment of the invention. The third embodiment comprises the same constituents of the first embodiment, as described above, with an exception of the frame 78. In this embodiment, the frame 78 includes the seal support portion 86 which remains the same as before, and forms a molding receptacle region 80 defined by the spacer 79, a molding platform 82 and an outer wall 84.

As shown in FIGS. 9-11, the spacer 79 extends perpendicularly between the outlet flow face 22 and the molding platform 82. However, in other embodiments, the spacer may extend in an oblique angle relative to the central axis 24. The molding platform 82 extends radially beyond the outer periphery 13 of the filter media pack 12, and meets the outer wall 84 extending axially upward. In this embodiment, the molding platform 82 orthogonally meets the outer wall 84 with a rounded connecting point, yet in other embodiments, an angle between the molding platform 82 and the outer wall 84 may be acute or obtuse with or without a rounded connecting point.

The frame 78 in this embodiment is constructed such that the outer wall 84 circumscribes the annular interface between the filter media pack 12 and the frame 78, as well as a portion of the filter media pack outer periphery 13 proximate the interface. The filter media pack seal 85 is formed in the molding receptacle region 80 and enclosed by the molding receptacle region 80.

The filter media pack 12 is secured against the frame 78 such that outer most wraps of the filter media pack 12 are in the molding receptacle region 80 wherein the filter media pack seal 85 extends into openings formed by some flutes along the outer wraps, preventing fluids from passing through the outer wraps of the filter media pack. All other components of this embodiment are the same as those components of the first embodiment as described above.

A method of making the filter element 120 of this embodiment may involve steps of forming the filter media pack 12, manufacturing the frame 78, molding the annular seal 18 on the seal support portion 86, and separately molding the filter media pack seal 85. Such method of making the filter element 120 is similar to the method of making the filter element 10 of the first embodiment as described above. The process of forming the filter media pack 12 is the same as described above in the first embodiment. The process of manufacturing the frame 78 also remains the same, except that the frame 78 of this embodiment forms the molding receptacle region 80 which is configured differently than the molding receptacle region 34 of the first embodiment.

The process of molding the annular seal 18 is mostly the same as the molding process described above in the first embodiment. However, the mold 88 in this embodiment may be constructed only for molding of the annular seal 18 without the raised peripheral wall 84, since the filter media pack seal 85 is molded in the molding receptacle region 80 of the frame 78, and not in the mold 88. The mold 32 in the first embodiment may also be utilized in this embodiment just for molding the annular seal 18 around the seal support portion 86. In this embodiment, the annular seal 18 may be molded before or after molding of the filter media pack seal 85.

In a process of molding the filter media pack seal 85, an uncured fluid sealing material is poured into the molding receptacle region 80 formed by the frame 78. Then the filter media pack 12 is placed in the frame 78 such that the outer wraps of the filter media pack 12 are in the molding receptacle region 80 and the outer periphery 13 of the filter media pack 12 is spaced evenly relative to the circumscribing outer wall 84. The outer wall 84 can include a set of locating ribs (not shown) to assist in centering the filter media pack 12 in the frame 78. In the molding receptacle region 80, the uncured fluid sealing material is allowed to foam and extend into openings formed by some flutes along the outer wraps. The sealing material also foams up around the outer periphery 13 of the filter media pack, sealing the interface between the filter media pack 12 and the frame 78. Preferably, the minimum radial thickness of the filter media pack seal 85 (e.g. minimum distance between the outer side of the filter media pack 12 and an inner surface of the outer wall 84) is typically between minimum 0.03 inches and 0.2 inches to allow sufficient room for a suitable molding pour and foaming opening. The uncured fluid sealing material may include, but not limited to, various foaming polymers such as polyurethane. The sealing material for the filter media pack seal 85 may be the same material used to form the annular seal 18, or may be formed from a different sealing material than the annular seal material.

FIGS. 12-14 illustrate a fourth embodiment of the invention. The filter element of this embodiment includes the filter media pack 12, the filter frame 98 and the annular seal 18. The filter frame 98 includes a seal support portion 100, a seat 90, and an annular wall 92 having a chamfer 104. The annular wall 92 extends axially along the outer periphery 13 of the filter media pack 12, circumscribing a portion of the outer periphery 13. Alternatively, the annular wall 92 may be constructed in a longer length to completely circumscribe the outer periphery 13 of the filter media pack 12, In one embodiment, the annular wall 92 may be 4 inches in length, circumscribing only the corresponding outer periphery of the filter media pack 12.

In this embodiment, the filter media pack 12 is attached to the frame 98 with an adhesive. Conventionally, a ring of adhesive bead is applied around the outer surface of the filter media pack 12 before the filter media pack is inserted into the frame 98, because it is easier to control application of the adhesive bead around the outer surface of the filter media pack than an inner surface of the frame 98. However, it is difficult to precisely center the filter media pack 12 into the frame 98. Therefore, when the adhesive bead is applied around the outer surface of the filter media pack 12, the chamfer 104 of the frame 98 often engages some parts of the adhesive ring prematurely causing a loss of a substantial amount of adhesive from those parts of the adhesive ring, resulting in inadequate attachment and/or seal between the filter media pack 12 and the frame 98.

Therefore, in this embodiment, the adhesive bead 94 is applied around an inner surface of the annular wall 92 of the frame 98 in spaced relation from the seat 90. The adhesive bead 94 is applied such that the filter media pack 12 engages the adhesive bead 94 after being centered into the frame 98 guided by the chamfer 104. The amount and type of the adhesive is judiciously selected to ensure that the filter media pack 12 is securely attached to the frame 98 and the interface therebetween is sealed. It is preferred that the adhesive bead 94 is applied between ¼ inch to 1 inch above the seat 90 where a gap between the annular wall 92 and the periphery of the filter media pack 13 is sufficiently less than a thickness of the adhesive bead 94 such that the filter media pack 12 can adequately engage and shear the adhesive bead 94 as it travels down toward the seat 90.

FIG. 12 shows the annular adhesive bead 94 as applied around the inner surface of the annular wall 92 at a preferred distance from the seat 90 as described above. After the application of the adhesive bead 94, the filter media pack 12 is inserted into the frame 98, guided by the chamfer 104. As shown in FIG. 13, the filter media pack 12 slides down along the annular wall 92, toward the seat 90, and engages the adhesive bead 94. After the outer periphery 13 of the filter media pack 12 engages the adhesive bead 94 and continues to slide downward, the outer periphery 13 causes the adhesive bead 94 to shear along the annular wall 92 toward the seat 90. When the filter media pack 12 finally reaches the seat 90, the adhesive bead is elongated, providing for a larger adhesion surface to attach and seal the filter media pack 12 against the annular wall 92.

The change in surface area of the adhesive bead 94 is illustrated in FIGS. 12-14. In FIG. 12, the adhesive bead 92 is shown as applied in the inner surface of the annular wall 92. FIG. 13 illustrates the adhesive bead 94, as the outer periphery 13 of the filter media pack 12, is engaged. Finally, elongated surface area of the adhesive bead 94 from the shearing action is shown in FIG. 14. Also, as shown in FIG. 14, the adhesive 94 seals the interface between the filter media pack 12 and the frame 98, preventing fluids from passing between the filter media pack 12 and the annular wall 92.

FIGS. 16-19 illustrate a fifth embodiment of the invention. The fifth embodiment is similar to the first embodiment, except the filter media pack seal 16 and the annular seal 18 are more distinctively separated since they are molded in a mold 32 including a mold undercut 162. That is, the mold undercut 162 reduces a risk of an uncured fluid material for the filter media pack seal 16 and/or the annular seal 18 from seeping between the chamfered seating surface 40 and the tapered region 50 of the mold 32, thereby preventing a filter media pack seal material from mixing with an annular seal material. In this embodiment, forming of the filter media pack seal 16 and forming of the annular seal 18 are contained in their respective mold cavities, thus the filter media pack seal 16 and the annular seal 18 are distinctively separate from each other.

This embodiment is particularly advantageous wherein the filter media pack seal 16 and the annular seal 18 are formed of two different types of polymers. Preferably, the filter media pack seal 16 of this embodiment is formed of a rigid urethane while the annular seal 18 is formed of a softer, urethane foam. A rigid urethane can be more advantageous than a softer urethane foam when used to form the filter media pack seal 16, since it can provide structural support and better protect the outer edges of the outlet flow face 22. On the other hand, the softer urethane foam, which is more resilient than the rigid urethane, may be better suited for the annular seal 18 for providing sealing function between the filter element 10 and the filter housing.

In such an embodiment, the filter media pack seal 16 may be formed of a rigid urethane having a durometer reading greater than 60A (all durometer readings herein are in ASTM D2240 type A scale using Shore Durometer Type A testing equipment), and preferably between 90A and 95A; while the annular seal 18 for the housing has a durometer reading less than 25A, and preferably between 5A and 8A. The rigid urethane used for the filter media pack seal 16 is a urethane material that expands less than 40% in volume during curing, and the softer urethane foam used for the annular seal 18 is a urethane material that expands more than 40% of volume during curing. Typically, the rigid urethane and the softer urethane foam materials are formulated differently, each including a different polyol. In this manner, the filter media pack seal 16 is molded with a much more controlled process while the annular seal 18 is less controlled, but more resilient and forgiving for its use with an external housing surface. Additionally, the filter media pack seal 16 is a protective border frame at the outlet end to protect against bumps during insertion and otherwise. In one embodiment, the filter media pack seal 16 has a durometer reading of about 92A which is formed of a rigid urethane that foams about 25% in volume during curing, and the annular seal 18 has a durometer reading of about 7A and is formed of a softer urethane that foams about 60% in volume during curing.

In other embodiments, the media pack seal 16 which also is a frame structure can also support the seal for housing. In such embodiments, a frame structure may be molded to the filter media pack 12 similar to the border frame 150 as described above. (FIGS. 20-22). Such a frame structure may have a media pack seal portion and annular seal support portion integrally formed in a mold. As it was with the border frame 150, this frame structure is integrally bonded when some of an uncured frame material enters some flutes and circumscribes the periphery of filter media pack 12 and cures. Once cured, the frame structure is integrally secured to the filter media pack 12 and an annular seal can then be molded on the annular seal support portion of the frame structure in a separate molding process.

The embodiment depicted in FIGS. 16-19 is shown with a protective wrapper 200. The protective wrapper 200 can protect the outer face sheet 13 of the filter media pack 12 from being damaged or punctured during handling. The protective wrapper 200 may also enhance overall appearance of the filter element 10 by hiding any imperfections such as makings, glue spots, etc. on the outer periphery of the filter medial pack 12 from manufacturing process. The protective wrapper may be formed of any suitable materials including, but not limited to, a spunbounded polymeric material manufacture by Reemay®, a plastic, an impermeable material such as a metalized plastic film, and a chipboard such as a heavy duty construction paper.

As it was with the first embodiment, the filter media pack seal 16 and the annular seal 18 are molded in a mold 32. However, the mold 32 of this embodiment includes a mold undercut 162 to ensure that a polymeric material for the filter media pack seal 16 does not mix with a polymeric material for the annular seal 18. The tapered region 50 of the mold 32 in this embodiment is connected to the undercut 162. As shown in FIG. 16, a portion of the molding platform 38 of this embodiment sits on the mold undercut 162. As a result, an uncured fluid sealing material for the annular seal 18 foams and rises around the seal support portion 26 and is capped by the mold undercut 162 and the molding platform 38. All other components and aspects of this embodiment remains the same as the first embodiment.

The embodiments described herein have the frame 14, 66, 78, 98 secured against the flow face 22 of the filter media pack 12. The flow face 22 may be an upstream end of the filter element in some embodiments, and may be a downstream end in other embodiments. The flow face without the frame 14, 66, 78, 98 can be protected by the border frame 19, 150 as shown in FIGS. 1,2 and 19, or left unsupported in some embodiments. The border frame 19, 150 may be added to any embodiments of the present invention and may be formed from the same material used to form the filter media pack seal 16 or the annular seal 18, or may be formed from a different suitable material. In some embodiments, the border frame 19, 150 may provide an additional sealing surface between the filter element 10 and the filter housing.

FIGS. 23-24 illustrate a filter element 300 according to a sixth embodiment of the-invention. The sixth embodiment is similar to the fifth embodiment, except a space 302 of this embodiment is radiused instead of the straight spacer 36, as shown in FIGS. 16-19. Further, the mold 304 may be configured to have a smaller annular space 306 between the outer periphery 308 of the filter media pack 310 and the mold inner wall 312 than the annular space 62 of the fifth embodiment. Further, the mold 304, as shown, does not include a plurality of locating ribs.

In this embodiment, the filter media pack 310 is generally centered into the mold 32, partially guided by a slanted surface 314, which is located near the top of the mold 304. The slanted surface 314 provides a wider opening toward the top of the mold 304 and reduces the size of the mold opening as it slops toward the center of the mold 304. As such, some portions of the filter media pack 310 may come in contact with the slanted surface 314 and slide down, as it is inserted into the mold 304. Depending upon the actual perimeter of the media pack (recognizing tolerance variations due to manufacture of different media packs, and that the outer wrap ends typically on one side creating a discontinuity with the terminating edge), portions of the media pack may also contact or about contact the inner wall 312 of the mold. Thus, the mold walls are arranged for available contact with the outer periphery of the filter media pack, because the frame does not intervene therebetween during insertion into the mold. Further, the relatively small annular space 306 can reduce a variance of the annular space 306 around the mold 304, thus the filter media pack 310 may be generally centered into the mold 304 without the plurality of locating ribs. Thus, this embodiment too works by locating the filter media pack by direct contact when necessary so as to correct misalignment when the media pack is plunged into the mold and/or to otherwise center the media pack.

As it was with the fifth embodiment, a filter media pack seal 316 may be formed of a rigid urethane foam material and an annular seal 318 may be formed of a softer urethane foam material. Similar to the molding methods described at length with regard to the first embodiment and the fifth embodiment, the annular seal 318 is first molded. Then an uncured rigid urethane material for the filter media pack seal 316 is poured, wherein the filter media pack 310 is generally centered. As shown in FIG. 23, the filter media pack 310 is placed approximate the vertex of the radiused spacer 302. The radiused spacer 302 may act as an undercut during a curing process, wherein the uncured rigid urethane material foams and rises. During the curing process, some of the uncured rigid urethane material enters openings formed by flutes in a molding receptacle region 320, defined by the radiused spacer 302, a molding platform 322 and the mold inner wall 312. Further, some of the uncured rigid urethane material rises around the periphery 308 of the filter media pack 310, and cures in the annular space 306. When cured, the filter media pack seal 316 is formed, securely attaching the filter media pack 310 and the frame 324.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non- claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of making a filter element comprising steps of:
   forming a filter media pack having outer wraps;
   manufacturing a frame having a seal support portion and forming at least a portion of a molding receptacle region;
   molding an annular seal around the seal support portion of the frame;
   separately molding a filter media pack seal generally occupying the molding receptacle region and sealing an annular interface between the filter media pack and the frame; and
   wherein the frame further includes a spacer and a molding platform forming at least a portion of the molding receptacle region, the molding platform having a terminal free edge adapted to abut an inner wall of a mold.

2. The method of making a filter element of claim 1 wherein the annular seal and the filter media pack seal are molded in the mold having an annular cavity adapted to receive an uncured fluid seal material for the annular seal, and a peripheral wall having the inner wall and an outer wall, the inner wall forming at least a portion of the molding receptacle region, the molding receptacle region adapted to receive an uncured fluid seal material for the filter media pack seal.

3. The method of making a filter element of claim 2 wherein the annular seal is molded by pouring the uncured fluid seal material for the annular seal into the annular cavity, and inserting the frame into the mold such that the seal support portion is placed in the annular cavity wherein the uncured fluid seal material expands around the seal support portion.

4. The method of making a filter element of claim 3, wherein the mold further includes an undercut providing a seating surface for the molding platform, wherein the expansion of the uncured fluid seal material in the annular cavity is capped by the molding platform and the undercut.

5. The method of making a filter element of claim 3, wherein the step of molding the filter media pack seal involves:
   placing the frame in the mold such that the molding platform of the frame abuts the inner wall of the mold, wherein the spacer, the molding platform and the inner wall define the molding receptacle region;
   pouring the uncured fluid seal material for the filter media pack seal into the molding receptacle region; and
   inserting the filter media pack centered onto the frame such that the uncured fluid sealing material for the filter media pack seal expands into the outer wrap of the filter media pack and expands up around the outer edge of the filter media pack, thereby sealing the annular interface between the filter media pack and the frame.

6. The method of making a filter element of claim 1, wherein the uncured fluid seal material for the annular seal and the filter media pack seal comprise an urethane foam material.

7. The method of making a filter element of claim 1 wherein the frame further includes an outer wall defining the molding receptacle region; the molding receptacle region adapted to receive an uncured fluid seal material for forming the filter media pack seal.

8. The method of making a filter element of claim 7, wherein the annular seal is molded in a mold having a cavity, by pouring an uncured fluid seal material for the annular seal into the cavity, and inserting the frame into the mold such that the seal support portion is placed in the cavity wherein the uncured fluid seal material expands around the seal support portion, forming the annular seal.

9. The method of making a filter element of claim 8, wherein the uncured fluid seal material for the annular seal comprises an urethane foam material.

10. The method of making a filter element of claim 8, wherein the uncured fluid seal material for the filter media pack comprises a rigid urethane and the uncured fluid seal material for the annular seal comprising a foam urethane which is softer than the rigid urethane.

11. The method of making a filter element of claim 7, wherein the filter media pack seal is molded by pouring the uncured fluid seal material for the filter media pack seal into the molding receptacle region, and inserting the filter media pack centered onto the frame such that the uncured fluid seal material expands into openings formed by some flutes along the outer wrap of the filter media pack and expands up around the outer edge of the filter media pack, sealing the annular interface between the filter media pack and the frame.

* * * * *